United States Patent
Sumioka et al.

(10) Patent No.: US 8,901,859 B2
(45) Date of Patent: Dec. 2, 2014

(54) CONTROL CIRCUIT FOR VIBRATION-TYPE ACTUATOR

(75) Inventors: Jun Sumioka, Yokohama (JP); Kenichi Kataoka, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 759 days.

(21) Appl. No.: 13/078,178

(22) Filed: Apr. 1, 2011

(65) Prior Publication Data

US 2011/0248652 A1  Oct. 13, 2011

(30) Foreign Application Priority Data

Sep. 4, 2010 (JP) .................................. 2010-090562
Sep. 11, 2010 (JP) .................................. 2010-251156

(51) Int. Cl.
- *H01L 41/04* (2006.01)
- *H02N 2/16* (2006.01)
- *H02N 2/14* (2006.01)

(52) U.S. Cl.
CPC .............. *H02N 2/163* (2013.01); *H02N 2/142* (2013.01)
USPC ........................................................ 318/116

(58) Field of Classification Search
USPC ........................................................ 318/116
See application file for complete search history.

(56) References Cited

U.S. PATENT DOCUMENTS

| | | | | |
|---|---|---|---|---|
| 5,872,416 A * | 2/1999 | Nogarede | ............... | 310/323.03 |
| 7,439,650 B2 * | 10/2008 | Sawada | ..................... | 310/316.02 |
| 2002/0168951 A1 * | 11/2002 | Paulus et al. | .................. | 455/130 |
| 2011/0222711 A1 * | 9/2011 | Kong et al. | .................... | 381/108 |
| 2013/0249445 A1 * | 9/2013 | Sumioka | ...................... | 318/116 |

FOREIGN PATENT DOCUMENTS

JP    6-077201 A    3/1994
JP    4152239 B2    9/2008

* cited by examiner

*Primary Examiner* — Kawing Chan
(74) *Attorney, Agent, or Firm* — Canon USA, Inc., IP Division

(57) ABSTRACT

A control circuit is provided for a vibration-type actuator that generates a vibration wave in a vibrating member by applying an alternating voltage, and relatively rotates a moving member contacting protrusions of the vibrating member. The control circuit includes a feedback control circuit and a repetitive compensator. The feedback control circuit subjects the vibration-type actuator to feedback control based on a deviation between a relative speed between the moving member and the vibrating member and a command speed or a deviation between a relative position between the moving member and the vibrating member and a command position. The repetitive compensator provides a repetitive period that is set to T/(an integral multiple of fs), where T is a period of rotation of the moving member, and fs is a spatial frequency of a speed deviation based on a contact area distribution between the protrusions and the moving member.

22 Claims, 25 Drawing Sheets

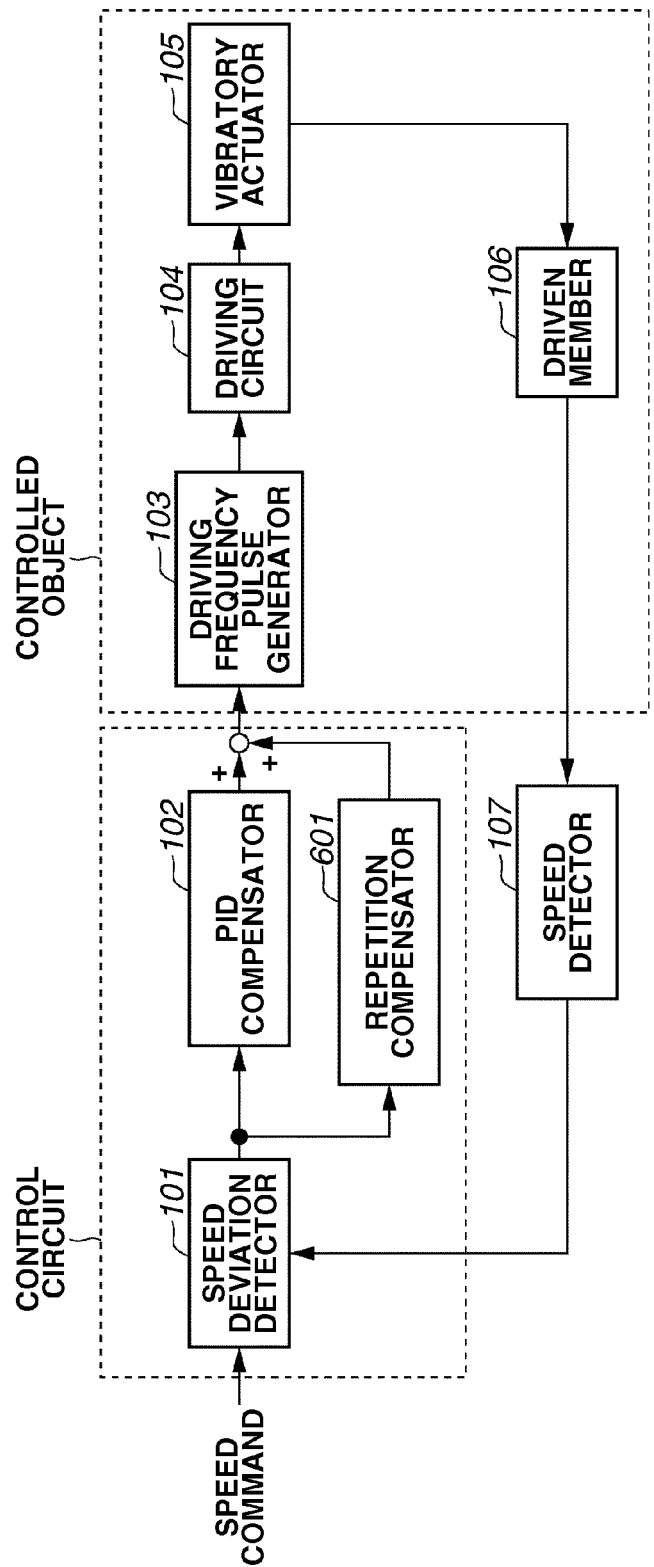

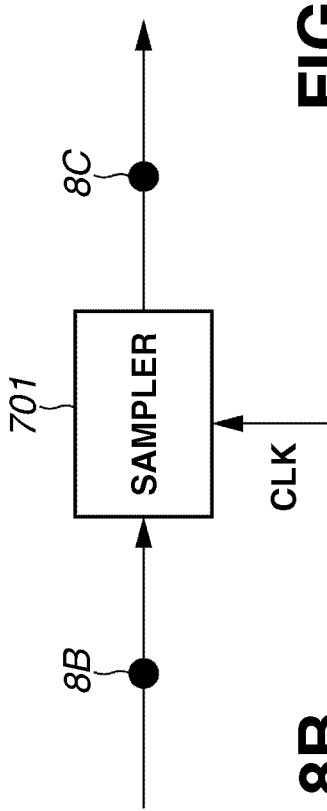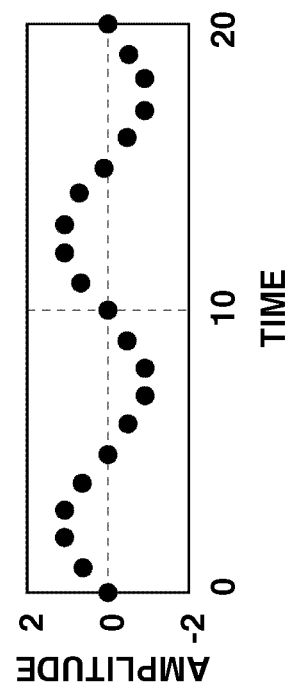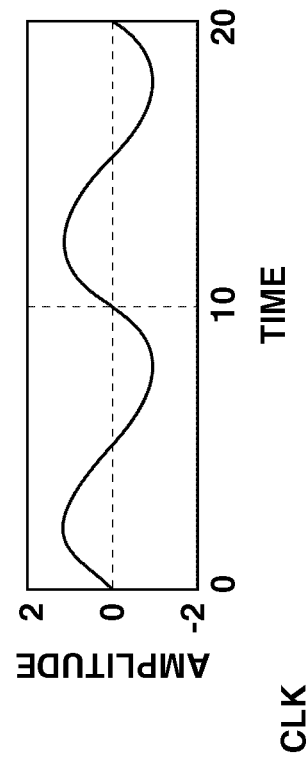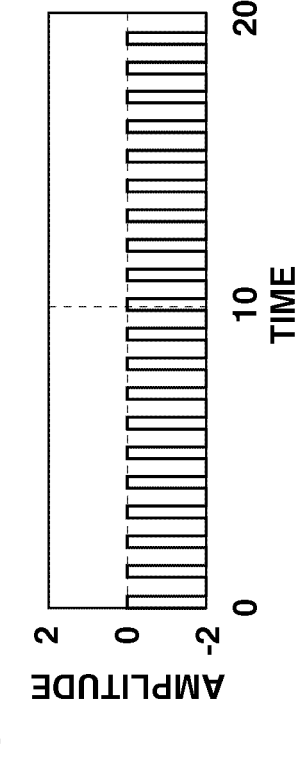

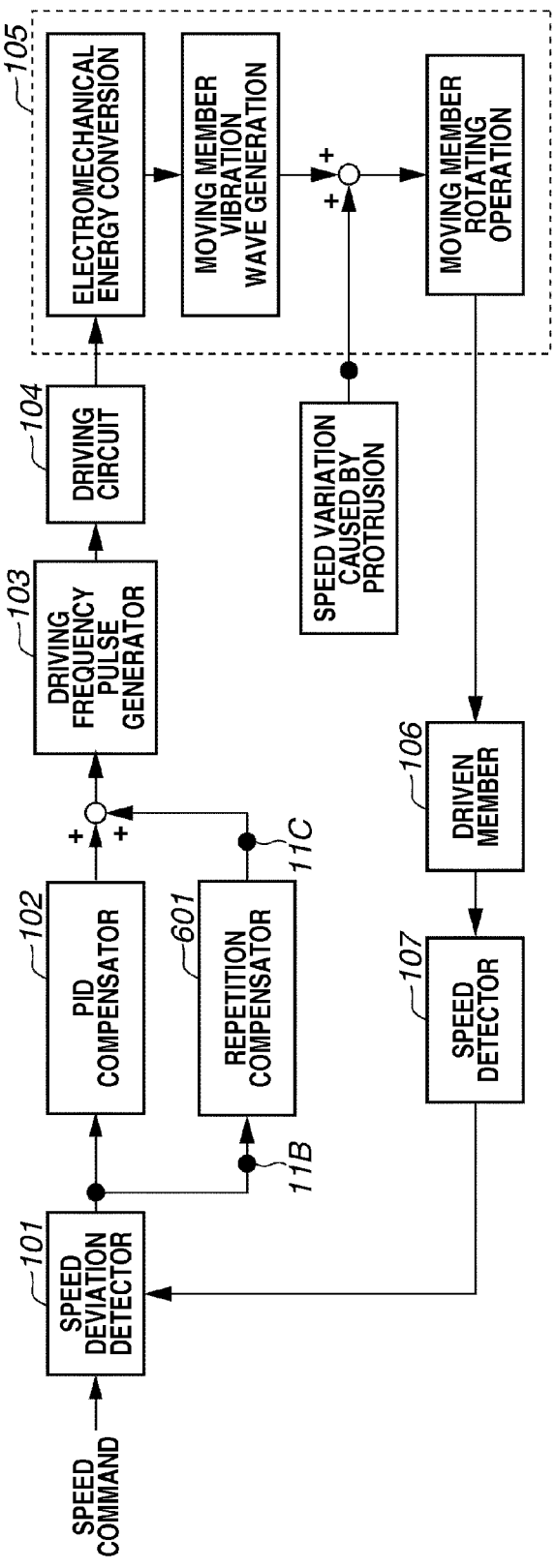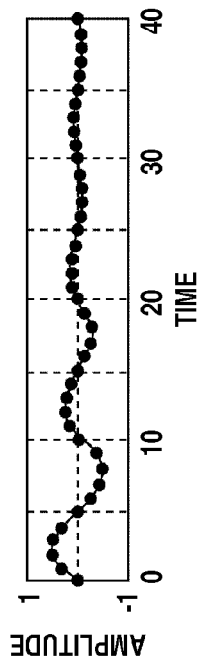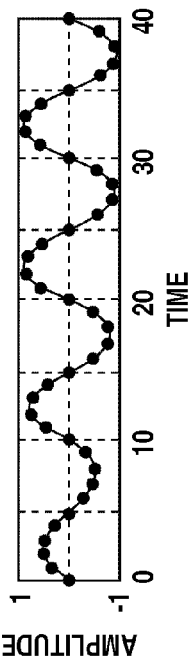

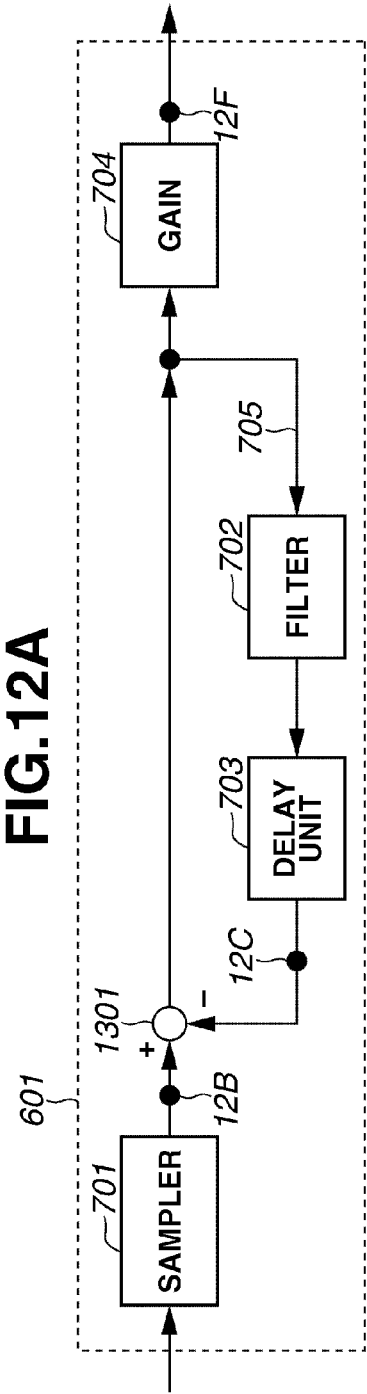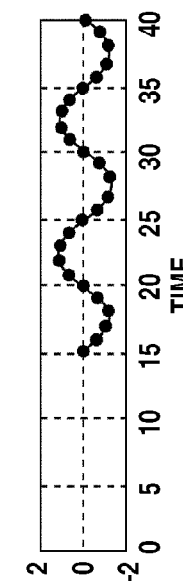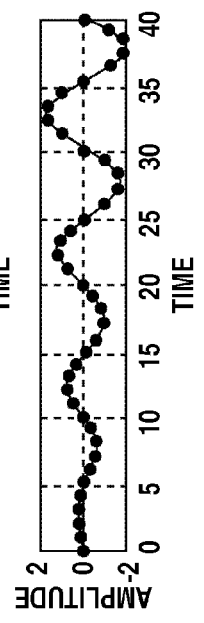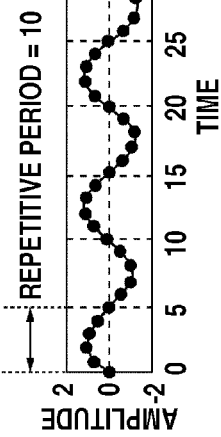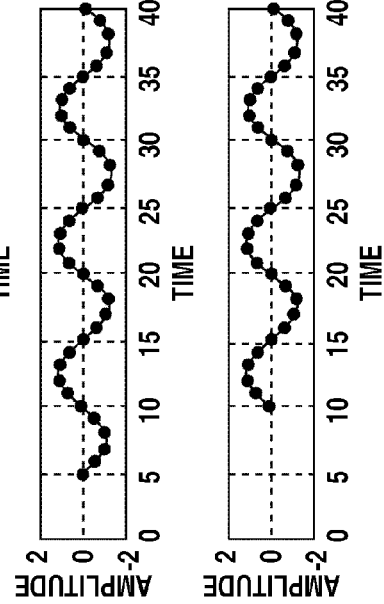

POSITIVE FEEDBACK

NEGATIVE FEEDBACK

CONTROL CIRCUIT FOR VIBRATION-TYPE ACTUATOR

BACKGROUND OF THE INVENTION

1. Field of the Invention

The present invention relates to a control circuit for a vibration-type actuator.

2. Description of the Related Art

A vibration-type actuator called a ultrasonic motor or a piezoelectric motor has already been put to practical use. However, in recent years, the vibration-type actuator has been actively developed toward a further improvement in performance. The vibration-type actuator is configured to apply an alternating voltage to an electromechanical energy conversion element such as a piezoelectric element or an electrostrictive element to generate high-frequency vibration in the element and take out its vibration energy as continuous machine motion. The vibration-type actuator is classified into a standing wave type vibration-type actuator and a traveling wave type vibration-type actuator depending on the type of vibration to be generated.

FIG. 1 illustrates a control system for a conventional traveling wave type vibration-type actuator. A command speed is given from a controller (not illustrated), a speed signal representing a relative speed obtained by a speed detector 107 such as an encoder and the command speed are input to a speed deviation detector 101, and a speed deviation signal is output. The speed deviation signal is input to a proportional integral derivative (PID) compensator 102, and a control signal is output. The PID compensator 102 is obtained by adding outputs of compensators respectively having functions of proportion (P), integration (I), and differentiation (D), and is generally used to compensate for a phase delay and a gain of a controlled object and construct a stable and high-precision control system. The control signal output from the PID compensator 102 is input to a driving frequency pulse generator 103 serving as the controlled object. The driving frequency pulse generator 103 generates a driving frequency pulse signal that changes in a driving frequency corresponding to the input control signal. A digital frequency divider circuit, a voltage controlled oscillator (VCO), or the like, is used as the driving frequency pulse generator 103. A pulse signal having a pulse width that changes depending on the control signal may also be generated under pulse width modulation (PWM) control. The driving frequency pulse signal output from the driving frequency pulse generator 103 is input to a driving circuit 104, so that an alternating voltage having two phases that differ by 90 degrees is output. The alternating voltage is an alternating signal having two phases that deviate by 90 degrees. A transformer coupling type voltage booster circuit or a coil/capacitor (LC) boosting circuit having a switching function, for example, is used as the driving circuit 104. The alternating voltage output from the driving circuit 104 is input to an electromechanical energy conversion element in a vibration-type actuator 105, and a moving member in the vibration-type actuator 105 is driven at a constant speed. A driven member 106 connected to the vibration-type actuator 105 is also similarly driven at a constant speed. The speed detector 107 detects a rotational speed. The vibration-type actuator 105 is subjected to feedback control so that the rotational speed comes closer to the command speed.

FIG. 2 is a perspective view illustrating an example of the vibration-type actuator 105. The vibration-type actuator 105 includes a vibrating member 203 composed of a combination of an electromechanical energy conversion element 201 and an elastic member 202, and a moving member 204. Each of the members has an annular shape in a θ direction. When a two-phase alternating voltage is applied to the electromechanical energy conversion element 201, a traveling vibration wave is generated in the vibrating member 203, and the moving member 204 contacting the vibrating member 203 relatively rotates by frictional driving.

FIG. 3 illustrates the elastic member 202. A plurality of protrusions 301 and grooves 302 are alternately provided, as illustrated in FIG. 3, on the side of the elastic member 202 which contacts the moving member 204. In an example illustrated in FIG. 3, 32 protrusions 301 and 32 grooves 302 are provided per circumference. The protrusion 301 is provided so that the amplitude of the traveling vibration wave can be increased at a contact portion with the moving member 204, i.e., at a front end of the protrusion 301. Therefore, a sufficient rotational driving force can be obtained. The protrusion 301 means a relatively convex portion obtained by forming protrusions and grooves that contact the moving member 204.

A feedback control circuit using the above-mentioned PID compensator 102 is widely used for not only the vibration-type actuator 105 but also another controlled object. On the other hand, there is a compensation control method referred to as repetitive control. Japanese Patent Publication No. 06-077201 discusses a repetitive compensator used for a feedback control system to which a target value in a same pattern is repeatedly given for each predetermined period. Registered Patent Publication No. 04152239 discusses a repetitive compensator used for a control system in which a setting value change or a load variation periodically occurs. If the repetitive control is used, an output follows a target input every time the number of repetitive periods increases, so that control with a significantly high absolute accuracy to be required can be obtained. However, there has been no proposal or specific configuration using the repetitive control for the vibration-type actuator. In control of the conventional vibration-type actuator, feedback control is used on the basis of the general PID compensator 102.

However, in the control system using the conventional PID compensator 102, a periodical speed variation corresponding to the number of protrusions 301 of the elastic member 202, which occurs during driving of the vibration-type actuator 105, cannot be sufficiently suppressed.

FIG. 4 is a schematic sectional view of the vibrating member 203 and the moving member 204 during driving. A traveling vibration wave is generated in a rightward direction in the vibrating member 203, and the moving member 204 is driven to rotate in a direction opposite thereto. When a contact portion between the traveling vibration wave and the moving member 204 is enlarged, a front end of the protrusion 301 and a surface of the moving member 204 contact each other, as illustrated in FIG. 4. While contact pressure at the contact portion is ideally always constant during driving, it actually differs due to the irregularities of a plane of protrusion 301 and the moving member 204 depending on a rotational position. More specifically, the contact pressure changes according to the number of protrusions 301 per rotation of the moving member 204. Thus, a variation in a mechanical resonance frequency of the vibrating member 203 corresponding to a contact area distribution between the protrusions 301 and the moving member 204 occurs in synchronization with the rotation of the moving member 204. The variation in the mechanical resonance frequency becomes an amplitude variation of the vibration wave occurring in the vibrating member 203. A periodical speed variation corresponding to the contact area distribution, i.e., the number of protrusions 301 occurs in synchronization with the rotation of the moving member 204.

FIG. 5 illustrates a spatial frequency distribution of a measured speed variation. The horizontal axis indicates a spatial frequency, and indicates the number of fluctuations of a speed variation per rotation (cycles/rotation), i.e., a rotation order. The vertical axis indicates an amplitude (dB) of a speed variation. This result is obtained by performing control using the control circuit for the conventional travelling wave type vibration-type actuator illustrated in FIG. 1, and accepting a speed deviation signal into an external measuring apparatus from the speed deviation detector 101 and analyzing the accepted speed deviation signal. FIG. 5 indicates that peaks occur at positions of spatial frequencies 46 and 92 respectively. The number of protrusions 301 of the elastic member 202 used for measurement is 46. The peak of the spatial frequency 92 is a secondary harmonic component of the spatial frequency 46. The inventors have also made a measurement for a case where the number of protrusions 301 of the elastic member 202 is changed and a case where the rotational speed is changed. In either case, they confirmed that a periodical speed variation corresponding to the number of protrusions 301 occurs.

The vibration-type actuator 105 for driving an electrophotographic drum in a copying machine is picked up here as an example. The moving member 204 is driven at a rotational speed of a maximum of 230 rpm. The vibration-type actuator 105 can perform high-precision speed or position control. If the vibration-type actuator 105 is used as a driving motor for the electrophotographic drum, therefore, an image that hardly shifts in color can be formed. When the vibration-type actuator 105 is driven at the rotational speed of 230 rpm, the speed variation occurs at 176 Hz and 353 Hz when converted into a time frequency. If a speed variation occurs in the electrophotographic drum, color gradation occurs in an image transferred onto paper. This is generally called banding. Gradation occurring in the vicinity of a spatial frequency 1 cycle/mm becomes most noticeable owing to a human luminous characteristic. When the rotational speed of the electrophotographic drum is 230 rpm, a speed variation in the vicinity of 360 Hz becomes the most noticeable frequency as banding. Therefore, not only the speed variation at 176 Hz by the protrusions 301 but also the speed variation at 353 Hz is required to be reduced.

However, the speed variations at 176 Hz and 353 Hz are in a higher band than a control band. Therefore, in a control circuit using the conventional PID compensator 102, a control gain cannot be too much increased, and a speed variation cannot be sufficiently reduced. Generally if the control band exceeds 100 Hz, a phase delay increases, depending on a controlled object including an actuator or a driven member to be used. Therefore, control is difficult to perform at a high gain. Therefore, in the control circuit of the vibration-type actuator 105, a control circuit of separate system for suppressing a periodical speed variation, based on a contact area distribution of the vibrating member 203 is required to be added to prevent banding and implement high-precision speed control.

SUMMARY OF THE INVENTION

The present invention is directed to providing a control circuit for a vibration-type actuator to solve the above-mentioned problem.

According to an aspect of the present invention, a control circuit for a vibration-type actuator that generates a vibration wave in a vibrating member including an electromechanical energy conversion element by applying an alternating voltage to the electromechanical energy conversion element, and relatively rotates a moving member contacting a plurality of protrusions of the vibrating member, the control circuit comprising: a feedback control circuit configured to subject the vibration-type actuator to feedback control based on a deviation between a relative speed between the moving member and the vibrating member and a command speed or a deviation between a relative position between the moving member and the vibrating member and a command position; and a repetitive compensator configured to provide a repetitive period that is set to T/(an integral multiple of fs), where T is a period of rotation of the moving member, and fs is a spatial frequency of a speed deviation based on a contact area distribution between the plurality of protrusions and the moving member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a control system for a vibration-type actuator in an exemplary embodiment.

FIGS. 8A to 8C illustrate a function of a sampler used in a repetitive compensator.

FIGS. 11A to 11C illustrate an operation of a control circuit.

FIGS. 12A to 12F illustrate a configuration of a negative-feedback type repetitive compensator.

DESCRIPTION OF THE EMBODIMENTS

Various exemplary embodiments, features, and aspects of the invention will be described in detail below with reference to the drawings.

The control circuit for the vibration-type actuator according to the present exemplary embodiment is applied to a vibration-type actuator, described below. More specifically, the vibration-type actuator applies an alternating voltage to an electromechanical energy conversion element provided in a vibrating member to generate a vibration wave in the vibrating member, and relatively rotates a moving member contacting a plurality of protrusions of the vibrating member by frictional driving. According to an embodiment, in speed and position control of a vibration-type actuator, a periodical speed variation based on a contact area distribution of protrusions of a vibrating member and a moving member can be significantly suppressed. When the vibration-type actuator is applied to driving of an electrophotographic drum in a copying machine, therefore, banding can be prevented. In control using another vibration-type actuator, high-precision speed and position control can be performed.

Figure 1:
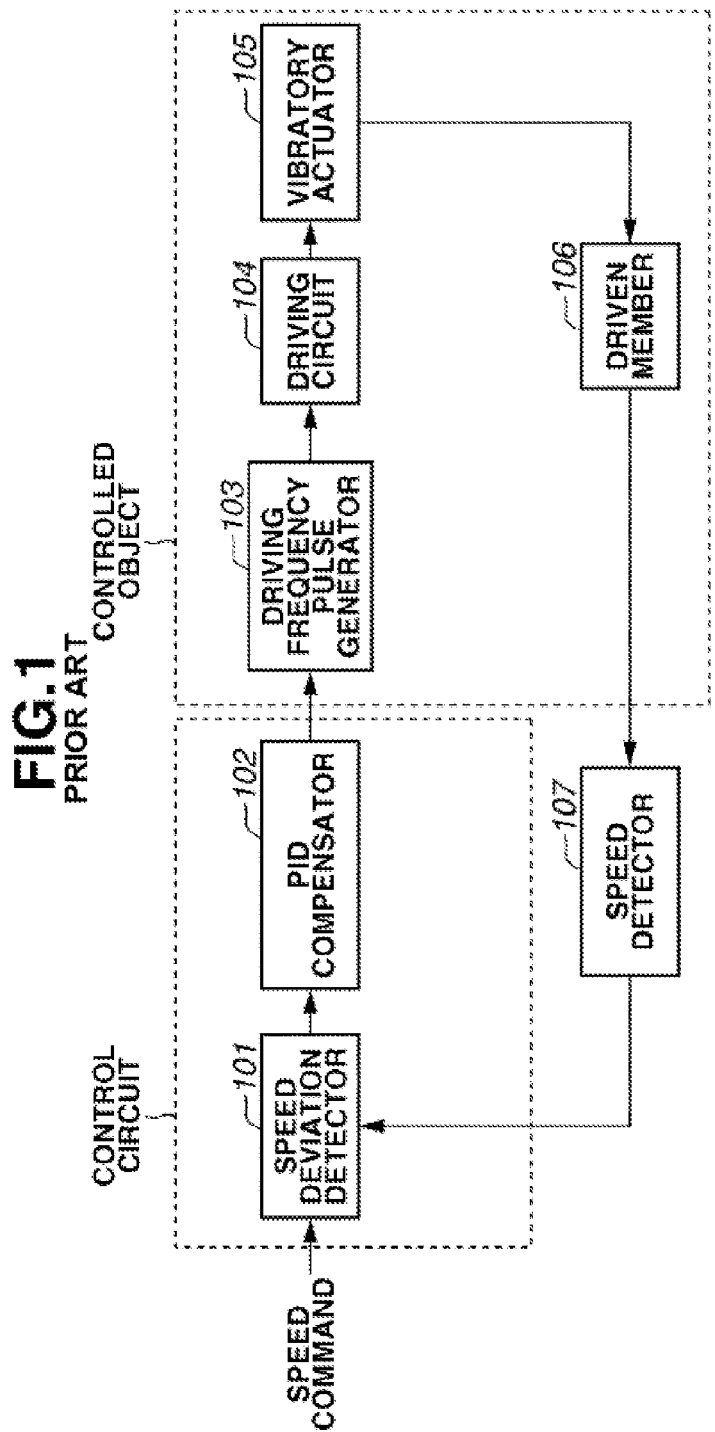
FIG. 1 illustrates a control system for a conventional traveling wave type vibration-type actuator.
Figure 2:
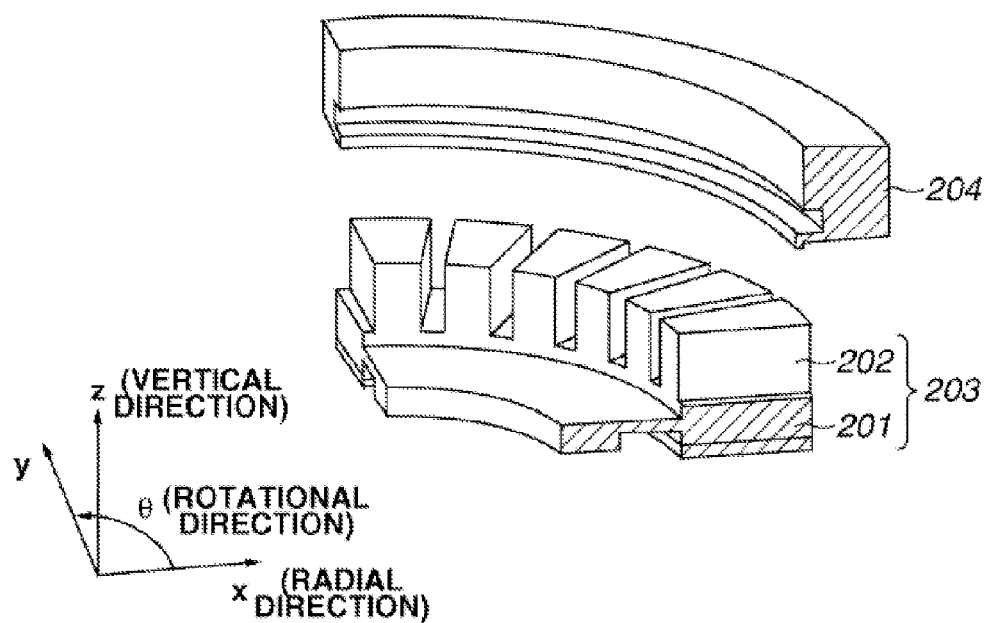
FIG. 2 is a partially perspective view illustrating an example of a vibration-type actuator.
Figure 3:
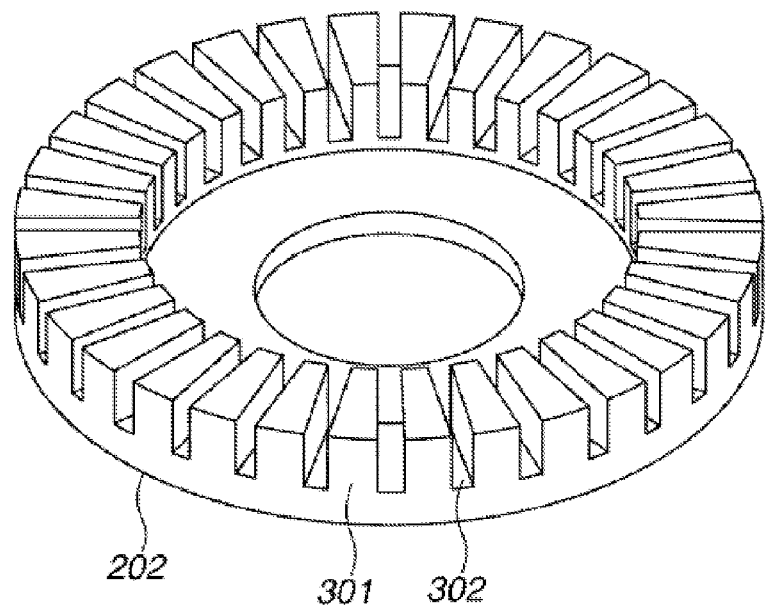
FIG. 3 illustrates the whole of an elastic member illustrated in FIG. 2.
Figure 4:
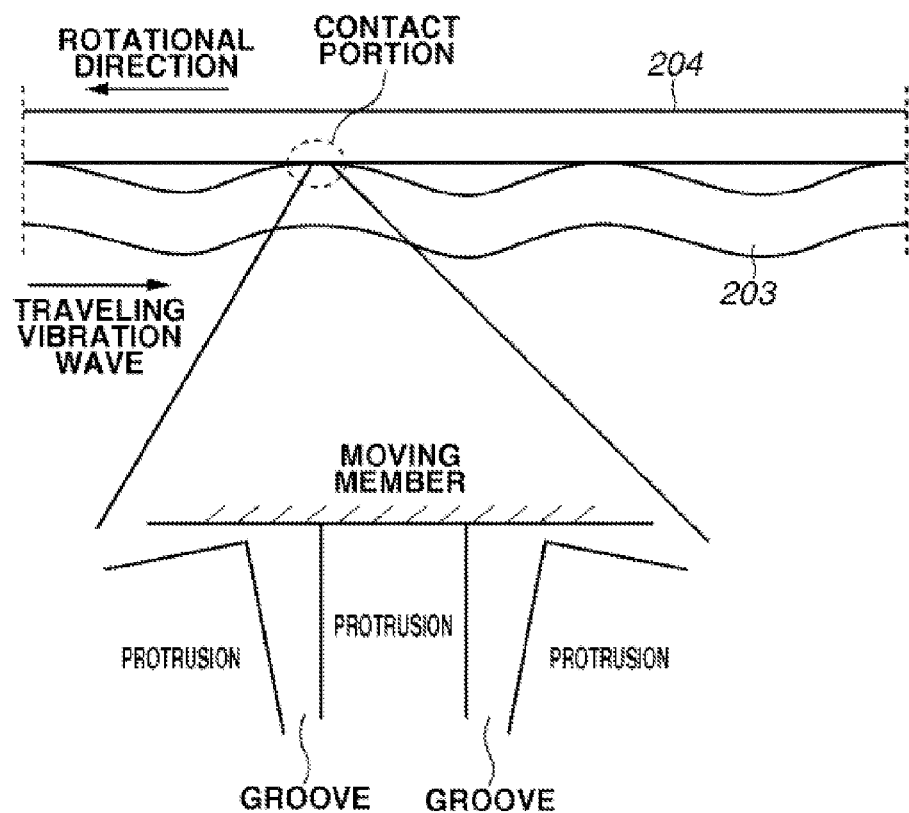
FIG. 4 is a schematic sectional view illustrating a state of a vibrating member and a moving member during driving.
Figure 5:
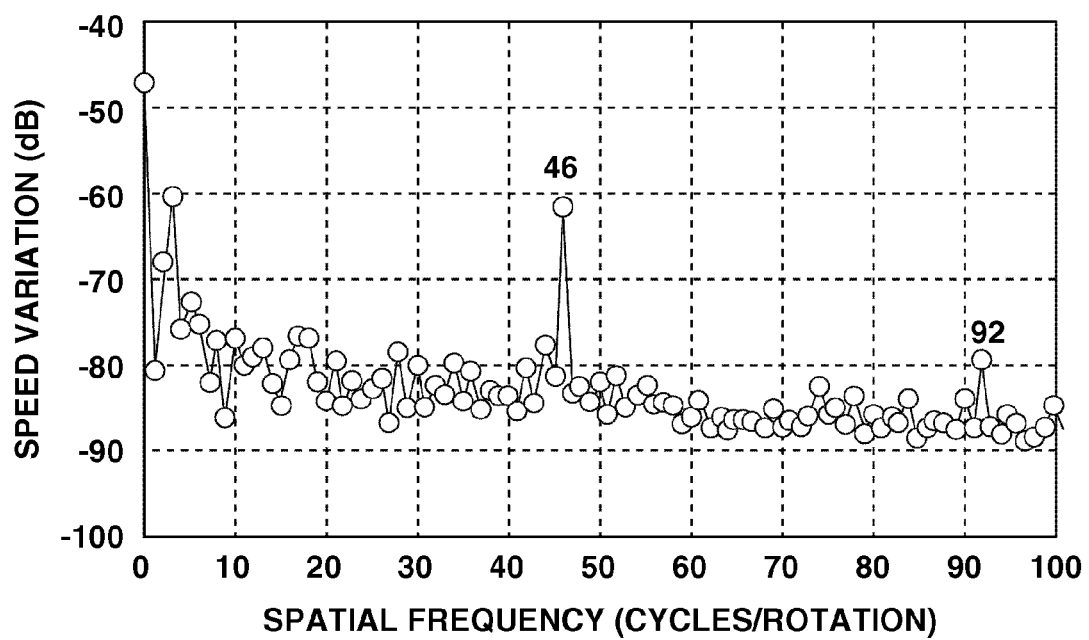
FIG. 5 illustrates a spatial frequency distribution of a measured speed variation.

FIG. 6 is a block diagram illustrating a control system for a vibration-type actuator according to an exemplary embodiment. A basic configuration of the control system for the vibration-type actuator is similar to that of a control system for a conventional vibration-type actuator illustrated in FIG. 1, and hence the description of components assigned the same numbers is not repeated.

In the control circuit, a speed deviation detector 101 outputs a speed deviation signal upon receipt of a command speed output from a controller (not illustrated) and a speed signal detected by a speed detector 107. The speed signal represents a relative speed between a driven member, which is integrated with or connected to a moving member, and a vibrating member or between the moving member and the vibrating member. The speed deviation signal is input to each of a PID compensator 102 and a repetitive compensator 601. Each signal subjected to calculation processing in the compensators is added by the output circuit together. The PID compensator 102 is not limited to this. A similar effect can be obtained in a series system of an integrator and a PID compensator, a proportional integral (PI) compensator, or a compensator having a low-pass filter or the like combined with its preceding or succeeding stage.

Figure 7A:
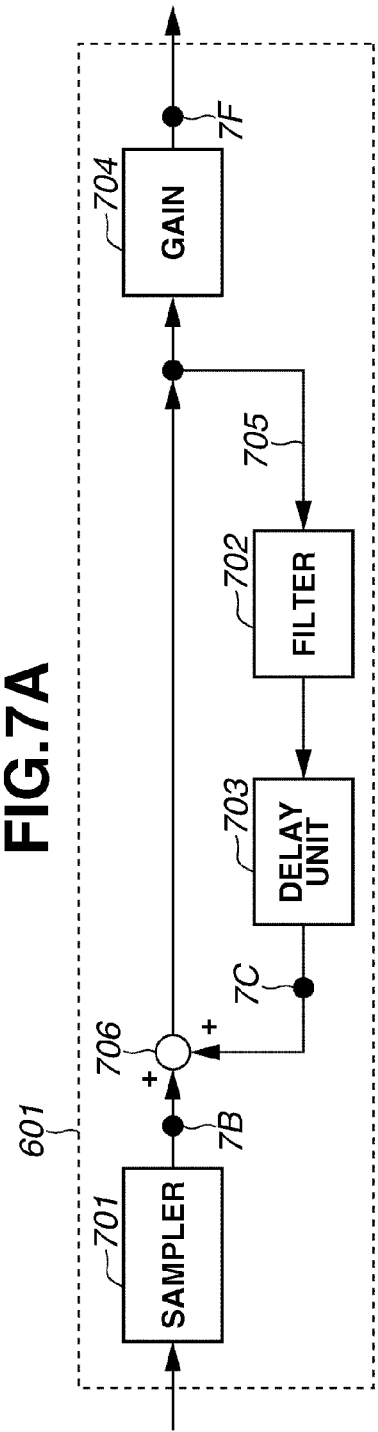
FIGS. 7A to 7F illustrate a configuration of a repetitive compensator.
Figure 7E:
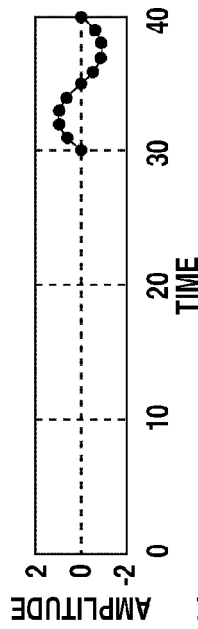
Figure 7F:
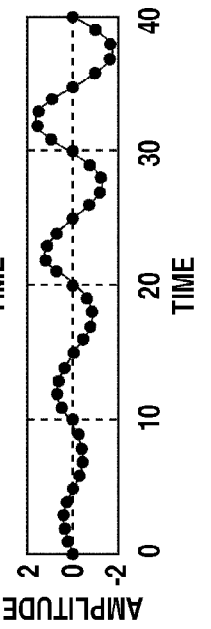
Figure 7B:
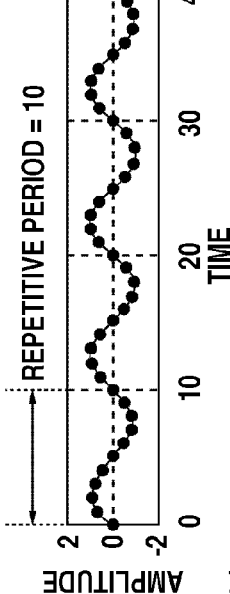
Figure 7C:
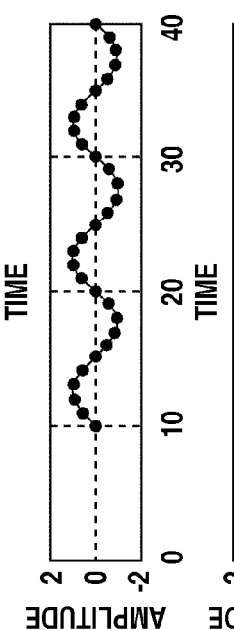
Figure 7D:
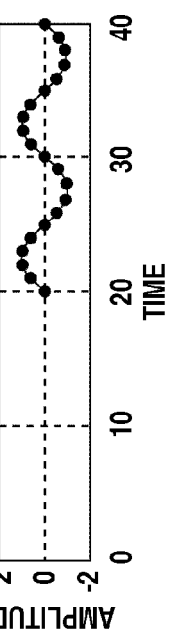

FIGS. 7A to 7F illustrate details of the repetitive compensator 601 illustrated in FIG. 6. A sampler 701 samples the speed deviation signal input to the repetitive compensator 601 in a particular discrete period of time. FIG. 7B illustrates an output signal 7B obtained by the sampling. For ease of illustration, a periodical speed variation is represented by a sine waveform, and a time change in amplitude is illustrated in 40 sampling periods. 10 sampling periods corresponding to one period of the sine waveform is described as a repetitive period. The number of sampling corresponding to the repetitive period is not limited to this, and is adjusted, as needed. The signal 7B illustrated in FIG. 7B is delayed by one repetitive period by passing via a path 705 and passing through a filter 702 and a delay unit 703. An adder 706 adds the delayed signal to the signal 7B illustrated in FIG. 7B. FIG. 7C illustrates a signal 7C which is delayed by one repetitive period. Similarly, FIG. 7D and FIG. 7E respectively illustrate signals which are delayed by two and three repetitive periods. An output signal of the adder 706 is output after being subjected to multiplication processing by a gain 704. FIG. 7F illustrates a signal obtained by adding the signals illustrated in FIGS. 7B, 7C, 7D, and 7E together. It can be seen how the amplitude of the signal increases every time the repetitive period is superimposed. More specifically, the repetitive compensator 601 can learn a periodical speed variation for each repetitive period, and control a frequency component corresponding to the repetitive period at a high gain.

A circuit constituting the repetitive compensator 601 will be described in detail below. FIGS. 8A to 8C illustrate a function of the sampler 701 used in the repetitive compensator 601. FIG. 8B illustrates a time change in amplitude corresponding to two periods, assuming that a signal 8B input to the sampler 701 has a sine waveform. A clock signal CLK is input to the sampler 701. The input signal 8B is sampled when the clock signal CLK is at a High level, i.e., enabled. The clock signal CLK operates by 10 clocks in one period of the sine waveform. FIG. 8C illustrates a signal obtained by sampling the signal 8B illustrated in FIG. 8B at timing of the clock signal CLK. More specifically, the sampler 701 has a function of converting the rate of the input signal at any sampling frequency. Calculation processing of the adder 706, the filter 702, the delay unit 703, and the gain 704 in the repetitive compensator 601 is performed based on a sampling frequency of the clock signal. Therefore, the repetitive period of the repetitive compensator 601 is determined based on a sampling frequency at which the repetitive compensator 601 operates.

Figure 9:
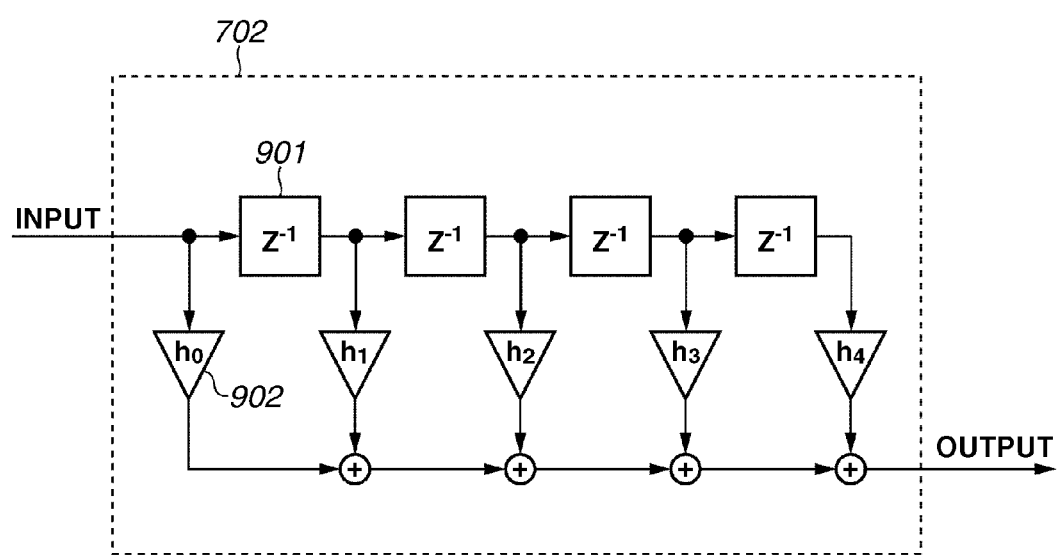
FIG. 9 illustrates an example of a filter used in a repetitive compensator.

FIG. 9 illustrates an example of the filter 702 used in the repetitive compensator 601. A low-pass filter is basically used as the filter 702. FIG. 9 illustrates a quaternary finite impulse response (FIR) filter. The FIR filter has an impulse response represented by a finite time length. The finite time length is a filter factor. An input signal is sequentially stored in registers 901. One of the registers 901 delays the input signal by one sampling period. The signals each delayed by one sampling period are respectively multiplexed by filter factors 902 of $h_0$ to $h_4$, and a signal obtained by adding all the delayed signals is output. The filter factors 902 of $h_0$ to $h_4$ determine the impulse response of the FIR filter, i.e., a frequency characteristic. A low-pass filter for passing a signal having a desired frequency less than or equal to cut-off frequency can be configured by adjusting the filter factors 902. It is desired that the cut-off frequency is set to at least a frequency of a repetitive period or more. The advantage of using the FIR filter is to have a liner phase characteristics. A phase delay linearly changes in all bands. Therefore, phase compensation is easily designed, and an output waveform relative to an input waveform is not distorted. An infinite impulse response (IIR) filter can be similarly used in the repetitive compensator 601, although it has a nonlinear phase characteristic.

Figure 10:
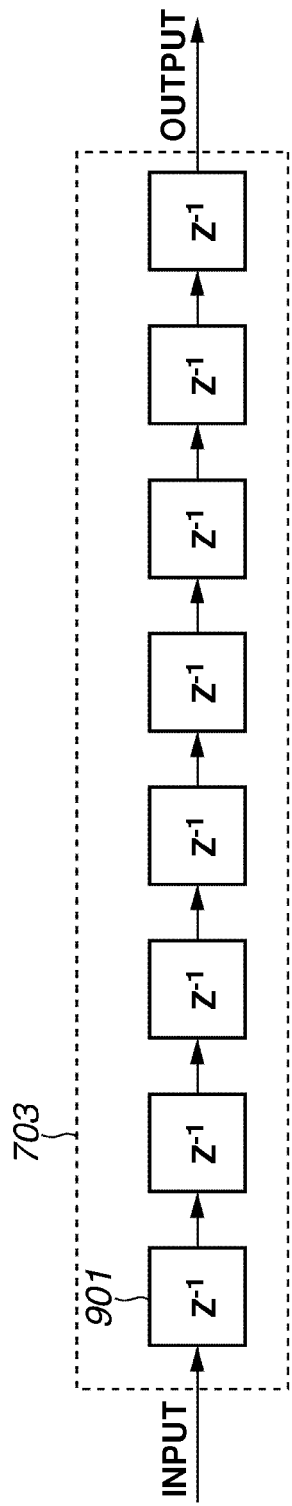
FIG. 10 illustrates an example of a delay unit used in a repetitive compensator.

FIG. 10 illustrates an example of the delay unit 703 used in the repetitive compensator 601. FIG. 10 illustrates an example of a delay unit including eight registers 901. Each of the registers 901 operates by a clock (not illustrated) based on a sampling frequency, and has a function of delaying an input signal by one sampling period. The input signal is sequentially stored in the registers 901, starting from the left, and moves while being delayed by one sampling period. Therefore, a signal obtained by delaying the input signal by eight sampling periods is output.

The repetitive period of the repetitive compensator 601 can be thus adjusted by configurations of the filter 702 and the delay unit 703 based on the sampling frequency of the sampler 701. When the quaternary FIR filter and the delay unit including the eight registers are used, for example, the repetitive period corresponds to 10 sampling periods. The number of delays in the quaternary FIR filter corresponds to half the number of registers 901, i.e., two sampling periods. For example, the number of delays in an eight-order FIR filter corresponds to four sampling periods, and the number of delays in a 16-order FIR filter corresponds to eight sampling periods. More specifically, the repetitive period is (1/sampling frequency)×(the sum of the respective numbers of delays in the filter and the delay unit).

In an embodiment, the repetitive period is set to the following value. More specifically, the repetitive period is set to T/(an integral multiple of fs) or T/(an integral multiple of N), where T is a rotational period of the moving member 204, fs is a spatial frequency of a speed variation (speed deviation) based on a contact area distribution of the plurality of protrusions 301 and the moving member 204, and N is the number of the protrusions 301. The set repetitive period allows a variation in a range where the effect is not greatly degraded, specifically, in a range of ±10% of the above-mentioned value. The above-mentioned representation "set to T/(an integral multiple of fs) or T/(an integral multiple of N)" includes the allowed variation.

FIGS. 11A to 11C illustrate an operation of the control circuit. A speed deviation signal output from the speed deviation detector 101 is input to the PID compensator 102 and the repetitive compensator 601. An output unit adds output signals respectively obtained by calculation processing together. FIGS. 11B and 11C illustrate the input signal 11B and the output signal 11C of the repetitive compensator 601 in a simplified manner. It can be seen how the input signal 11B illustrated in FIG. 11B is attenuated with time as the output signal 11C illustrated in FIG. 11C is amplified with time. The respective output signals of the PID compensator 102 and the repetitive compensator 601 are input to a drive frequency pulse generator 103 after being added together. The drive frequency pulse generator 103 generates a pulse signal corresponding to the input signal. The pulse signal is input to a driving circuit 104, and is output after being boosted to an alternating voltage sufficient to drive a vibration-type actuator 105. The alternating voltage is then applied to an electromechanical energy conversion element 201, and is subjected to electromechanical energy conversion so that a vibration wave is generated in a vibrating member 203. As described above, the moving member 204 is driven to rotate by friction with the protrusions 301 at the contact portion of the moving member 204 due to the vibration wave.

As described above, if the control circuit for the vibration-type actuator is used, the periodical speed variation corresponding to the protrusions 301 of the vibrating member 203 can be reduced.

The control circuit is also similarly applicable in feedback control by a positional deviation between a relative position between a driven member, which are integrated with or connected to the moving member 204, and the vibrating member 203 or between the moving member 204 and the vibrating member 203 and a command position.

A first exemplary embodiment in which the control circuit is actually applied to the vibration-type actuator will be described. A vibration-type actuator 105 used for measurement is of a traveling wave type in which an elastic member 202 is provided with 46 protrusions 301.

A configuration of the used repetitive compensator 601 will be specifically described. A command speed is set to 230 rpm (a rotational period T=261 ms), and a sampling frequency of the repetitive compensator 601 is set to 10 kHz. In this case, the repetitive period of the repetitive compensator 601 is 5.7 ms (261 ms/(46×1)) from T/(an integral multiple of fs), described above. The integral multiple is set to a factor of one.

Therefore, each of the filter 702 and the delay unit 703 in the repetitive compensator 601 may be delayed by 57 sampling period (=5.7 ms×10 kHz). A 56-order FIR filter is used as the filter 702 and delayed by 28 sampling periods, and 29 registers 901 are provided in the delay unit 703, to configure the repetitive compensator 601. A cut-off frequency of the 56-order FIR filter is set to approximately 500 Hz. A gain 704, which subjects an output of the repetitive compensator 601 to multiplication processing, adjusts a balance with a gain of the PID compensator 102. The PID compensator 102 can totally reduce a speed variation other than a periodical speed variation caused by protrusions 301 of a vibrating member 203. In an embodiment, the gain 704 is set so that the ratio thereof to the gain of the PID compensator 102 is 1:1.

Figure 17:
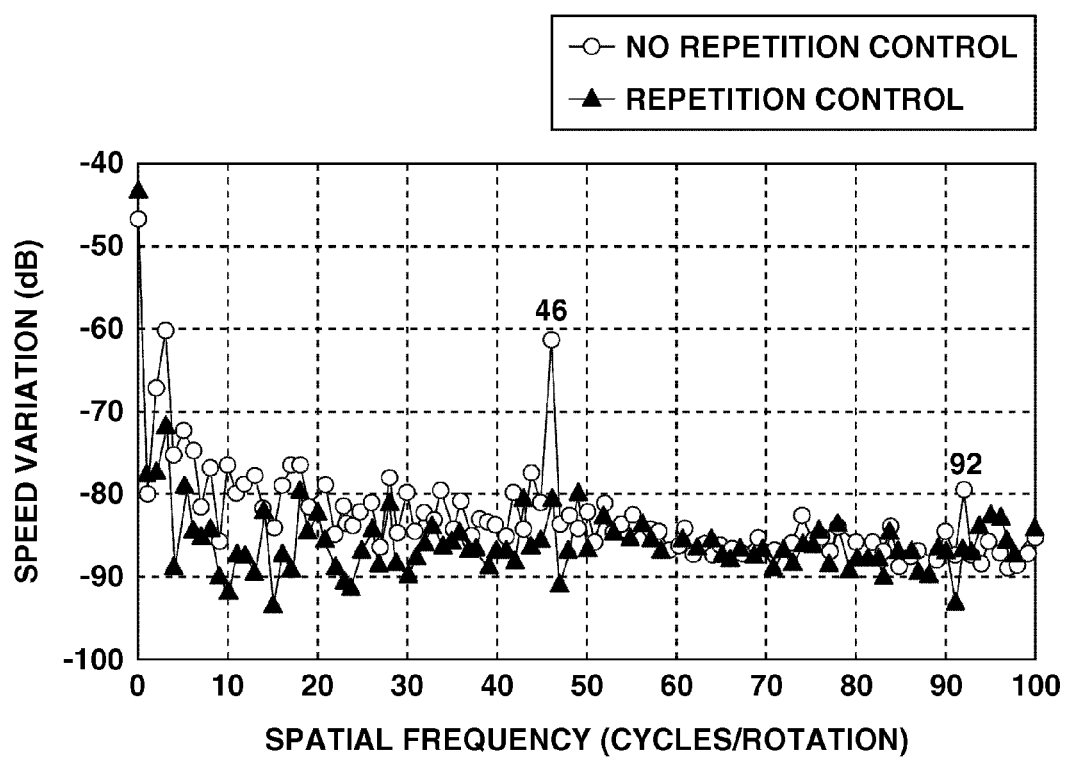
FIG. 17 illustrates a spatial frequency distribution of a speed variation in a case where a control circuit according to a first exemplary embodiment is applied.

FIG. 17 illustrates a spatial frequency distribution of a speed variation in a case where the control circuit according to the first exemplary embodiment is applied. The horizontal axis indicates a spatial frequency per rotation, and the vertical axis indicates a speed variation (speed deviation) of the speed deviation detector 101. For comparison, results respectively obtained when there is no repetitive compensator and when there is a repetitive compensator are illustrated. When there is a repetitive compensator, a speed variation of a spatial frequency 46, which is considered to be based on a spatial contact area distribution of the protrusions 301 of the vibrating member 203, is reduced by approximately 20 deB, and a spatial frequency 92 serving as a secondary harmonic component of the spatial frequency 46 is also reduced by 10 dB or more, compared to when there is no repetitive compensator. The secondary harmonic component is also reduced because the repetitive compensator 601 is of a positive feedback type so that second-order, third-order, and fourth-order harmonic components of a repetitive frequency exist, and is repeatedly controlled to the cut-off frequency or less, which is set in the filter 702. When the control circuit is applied, the periodical speed variation caused by the protrusions 301 of the vibrating member 203 can be effectively reduced.

FIG. 12A to FIG. 12F illustrate a configuration of a negative-feedback type repetitive compensator 601 used for a second exemplary embodiment. The negative-feedback type repetitive compensator 601 differs from the repetitive compensator 601 used for the first exemplary embodiment in that an output of the repetitive compensator 601 is returned to an input of the repetitive compensator 601 by not positive feedback but negative feedback. FIG. 12B illustrates an output signal of a sampler 701. The output signal is sampled at a sampling frequency used for calculation of the repetitive compensator 601. A repetitive period in the negative feedback is half that in the positive feedback, and is represented by five sampling periods. The signal illustrated in FIG. 12B is delayed by five sampling periods by a filter 702 and a delay unit 703 after passing through a path 705. The delayed signal is inverted and input to a subtracter 1301. FIG. 12C illustrates an inversion signal of a signal obtained by delaying the repetitive period once. In the negative feedback, a signal waveform can be repeated in the same phase by reducing the repetitive period by half. Similarly, FIG. 12D illustrates an inversion signal obtained by delaying the repetitive period twice, and FIG. 12E illustrates an inversion signal obtained by delaying the repetitive period three times. A gain 704 subjects an output signal of the subtracter 1301 to multiplication processing. FIG. 12F illustrates a signal obtained by adding the signals illustrated in FIGS. 12C, 12D, and 12E to the signal illustrated in FIG. 12B. It can be seen how the amplitude of the signal increases every time the repetitive period is superimposed, like in the positive feedback. Both of the positive feedback and the negative feedback may be used. However, in the negative feedback, the repetitive period is smaller because it is based on a repetitive characteristic in a half period so that the number of registers can be suppressed. Further, there is little phase change other than the vicinity of the repetitive period. Therefore, the negative-feedback type repetitive compensator is easy to handle when used concurrently with another control system.

Figure 22A:
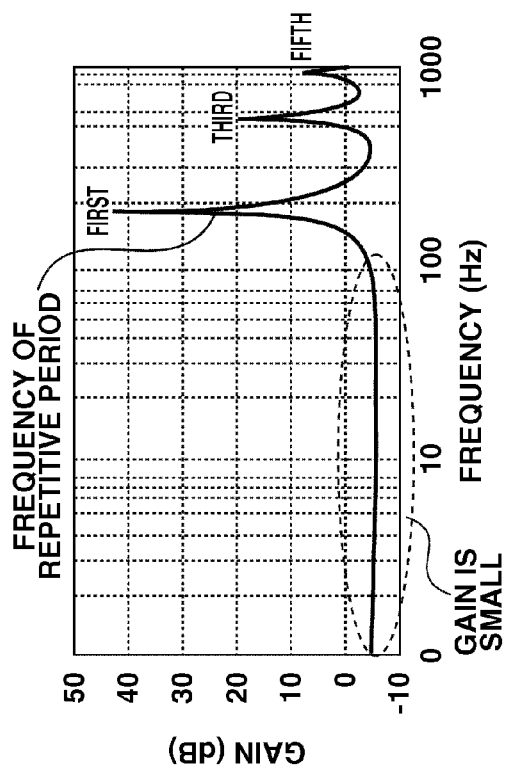
FIGS. 22A and 22B illustrate an open loop characteristic of a negative-feedback type repetitive compensator.
Figure 22B:
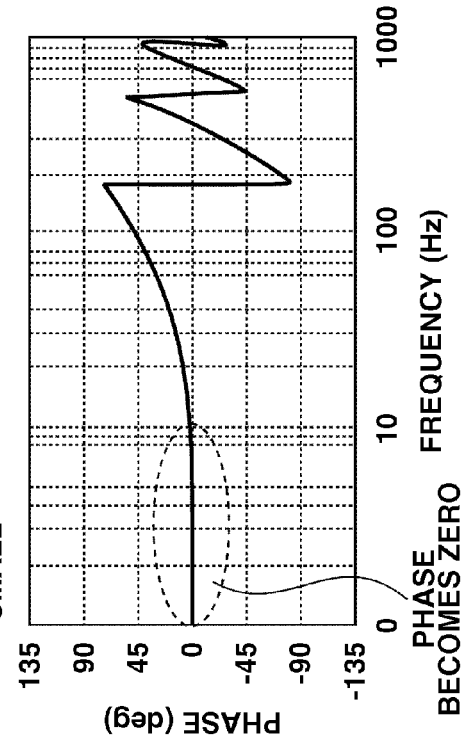

FIGS. 22A and 22B illustrate an open loop characteristic of the repetitive compensator according to the present exemplary embodiment. FIG. 22A illustrates an open loop characteristic of the positive-feedback type repetitive compensator for the purpose of comparison, and FIG. 22B illustrates open loop characteristics of the negative-feedback type repetitive compensator. An upper figure and a lower figure respectively indicate a frequency characteristic of a gain and a frequency characteristic of a phase. The figures indicate that a phase in a low band is zero degree in the negative feedback. Further, a gain in the low band is also small. Even if the repetitive compensator is connected in parallel with another control system, it hardly affects an output signal at a frequency other than the repetitive frequency. An even-order peak disappears when the frequency of the repetitive period is set to a primary frequency. When a speed variation at a higher-order peak is also reduced, therefore, a repetitive compensator corresponding to an even-order frequency is required to be separately connected in parallel according to a fourth exemplary embodiment, described below.

The negative-feedback type repetitive compensator is applied to the vibration-type actuator used in the first exemplary embodiment, for example. Therefore, a periodical speed variation caused by protrusions of a vibrating member can be reduced at low cost.

Figure 13:
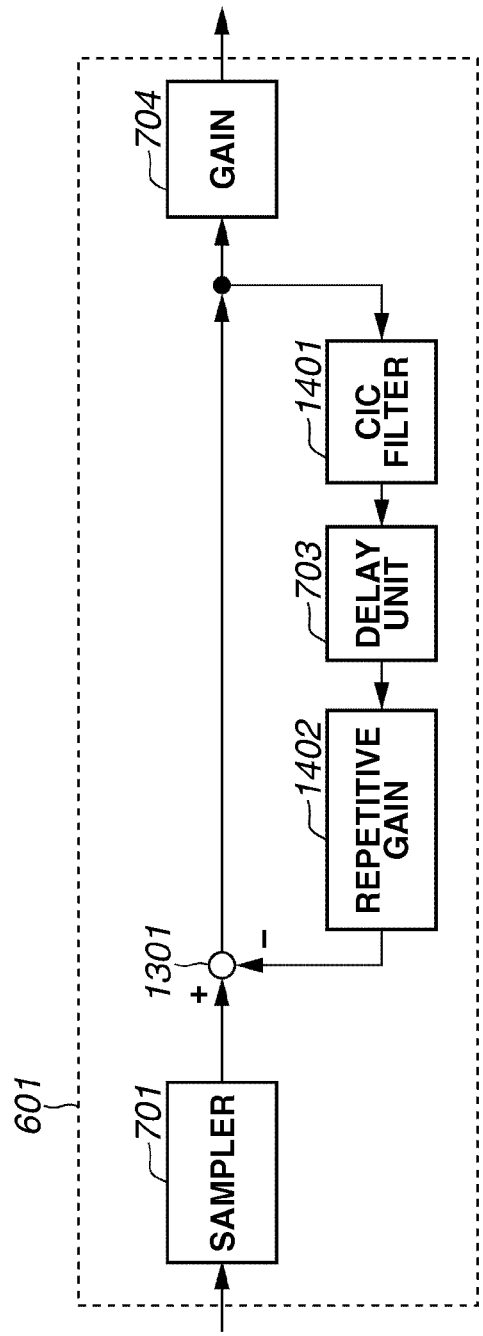
FIG. 13 illustrates a configuration using a cascaded integrator comb (CIC) filter in the repetitive compensator.

FIG. 13 illustrates a third exemplary embodiment using a CIC filter 1401 in a repetitive compensator 601. In the present exemplary embodiment, the above-mentioned negative-feedback type repetitive compensator is used as the repetitive compensator. The CIC filter 1401 is a combination of a comb filter having a notch characteristic and an integrator. In the CIC filter, the number of multipliers can be made smaller than that in the FIR filter. Therefore, a low-pass filter having a simpler configuration can be produced. However, a lower-order CIC filter has a gentle attenuation characteristic. Therefore, if a high-order component of a repetitive period is attenuated, a gain at the frequency of the repetitive period cannot be sufficiently obtained. Thus a repetition gain 1402 is provided to adjust the gain. A sufficient gain can be obtained as to the repetition gain 1402 when a gain of an open loop characteristic of an input/output signal in a subtracter 1301 is adjusted to be as large as possible in a range of 0 dB or less at the frequency of the repetitive period.

Figure 23A:
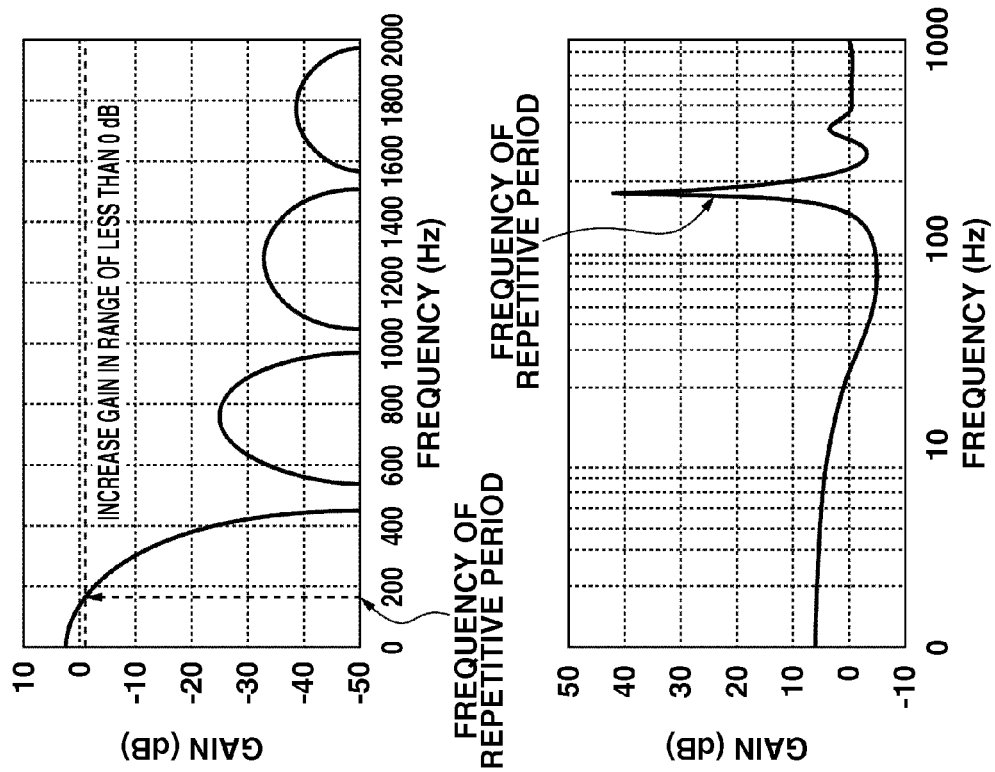
FIGS. 23A and 23B illustrate adjustment of a repetitive gain in a repetitive compensator using a CIC filter.
Figure 23B:
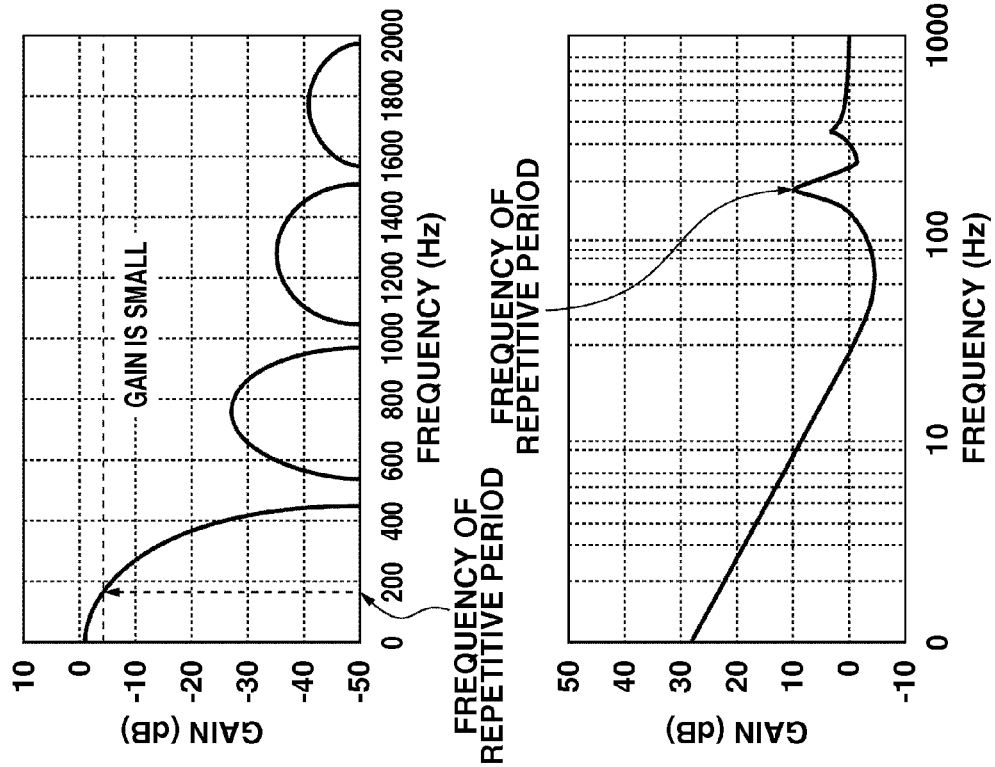

A method for adjusting the repetitive gain 1402 in the repetitive compensator 601 using the CIC filter 1401 is described with reference to FIGS. 23A and 23B. FIG. 23A illustrates a transmission characteristic in a case where the repetitive gain 1402 is set to one. An upper figure and a lower figure respectively indicate a frequency characteristic of a gain of the CIC filter 1401 and an open loop characteristic of the gain of the repetitive compensator 601. The frequency of the repetitive period is 176 Hz. The gain of the CIC filter 1401 is −3.6 dB at a frequency of the repetitive period. As a result, the gain of the repetitive compensator shows a small peak. Thus, a periodical frequency variation cannot be sufficiently reduced. On the other hand, FIG. 23B illustrates a transmission characteristic in a case where the repetitive gain 1402 is multiplied. In FIG. 23B, the repetitive gain 1402 is adjusted to 1.5 times that illustrated in FIG. 23A. The gain of the CIC filter 1401 is −0.1 dB at the frequency of the repetitive period. As a result, the gain in the open loop characteristic of the repetitive compensator 601 can be sufficiently increased. The repetitive gain 1402 needs to be adjusted to be sufficiently large in a range of less than 0 dB. When the gain is 0 dB or more, a closed loop characteristic of the repetitive compensator 601 becomes unstable, so that a control system oscillates.

Figure 14:
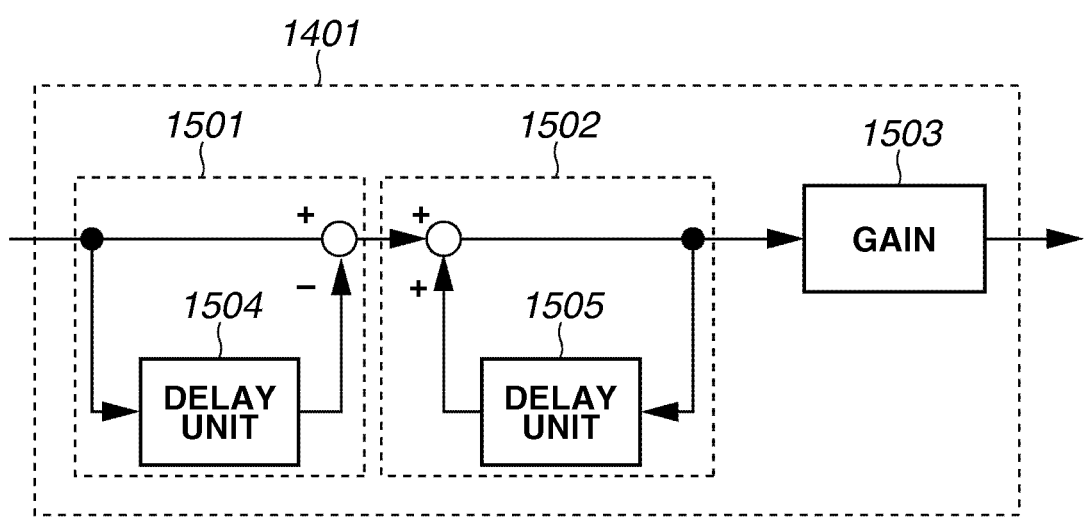
FIG. 14 illustrates a configuration of a general CIC filter.

FIG. 14 illustrates a configuration of the CIC filter 1401. The CIC filter 1401 includes a differentiator 1501, an integrator 1502, and a gain 1503. The differentiator 1501 subtracts a signal delayed by a delay unit 1504 from an output, and corresponds to a Comb filter having a notch characteristic. The integrator 1502 adds a signal delayed by a delay unit 1505 to an input. By connecting the integrator 1502, characteristics of a low-pass filter is obtained. For example, the number of registers 901 in the delay unit 1504 is 20, and the number of registers 901 in the delay unit 1505 is one. A factor is set in the gain 1503 where the number of delays in the delay unit 1504 is a denominator of the factor and the number of delays in the delay unit 1505 is a numerator of the factor. In this case, the factor is 1/20. CIC filters are connected in multiple stages so that a steeper low-pass filter characteristic can be obtained in the vicinity of a cut-off frequency.

Figure 15:
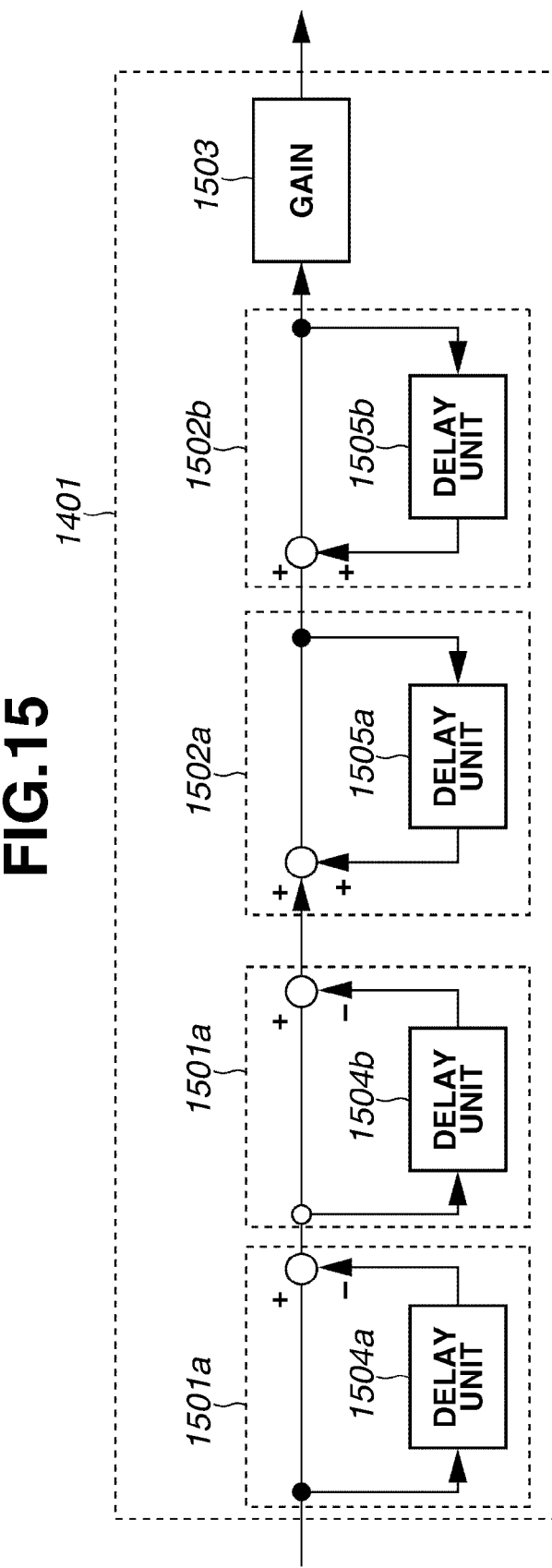
FIG. 15 illustrates a configuration of a two-stage CIC filter.

FIG. 15 illustrates a configuration of a two-stage CIC filter 1401. A differentiator 1501a and a differentiator 1501b are the same. A delay unit 1504a and a delay unit 1504b are the same. An integrator 1502a and an integrator 1502b are also the same. A delay unit 1505a and a delay unit 1505b are also the same.

Consider a case where an embodiment is applied to the vibration-type actuator used in the first exemplary embodiment. A command speed is set to 232.5 rpm (a rotational period T=258 ms), and a sampling frequency of the repetitive compensator 601 is set to 10.695 kHz. In this case, a repetitive period of the repetitive compensator 601 is 2.8 ms (258 ms/(46×2)) from T/(an integral multiple of fs), described above. The integral multiple is set to a factor of two because the repetitive compensator 601 is of a negative-feedback type.

Therefore, the CIC filter 1401 and the delay unit 703 may be delayed by 30 sampling periods (=2.8 ms×10.695 kHz). The CIC filter 1401 is delayed by 19 sampling periods by setting the number of registers 901 in each of the delay unit 1504a and 1504b to 20 and setting the number of registers 901 in each of the delay unit 1505a and 1505b to one, and 11 registers 901 are provided in the delay unit 703. A gain 1503 in this case is 1/400. The number of delays in the CIC filter 1401 is a value obtained by subtracting half of a delay amount of the integrators from half of a delay amount of the differentiators. In this case, a delay amount corresponds to (20−1), i.e., 19 sampling periods. When the repetitive compensator 601 using the CIC filter 1401 is applied to the vibration-type actuator used in the first exemplary embodiment, for example, a periodical speed variation caused by protrusions of a vibrating member can be reduced at low cost.

Figure 16:
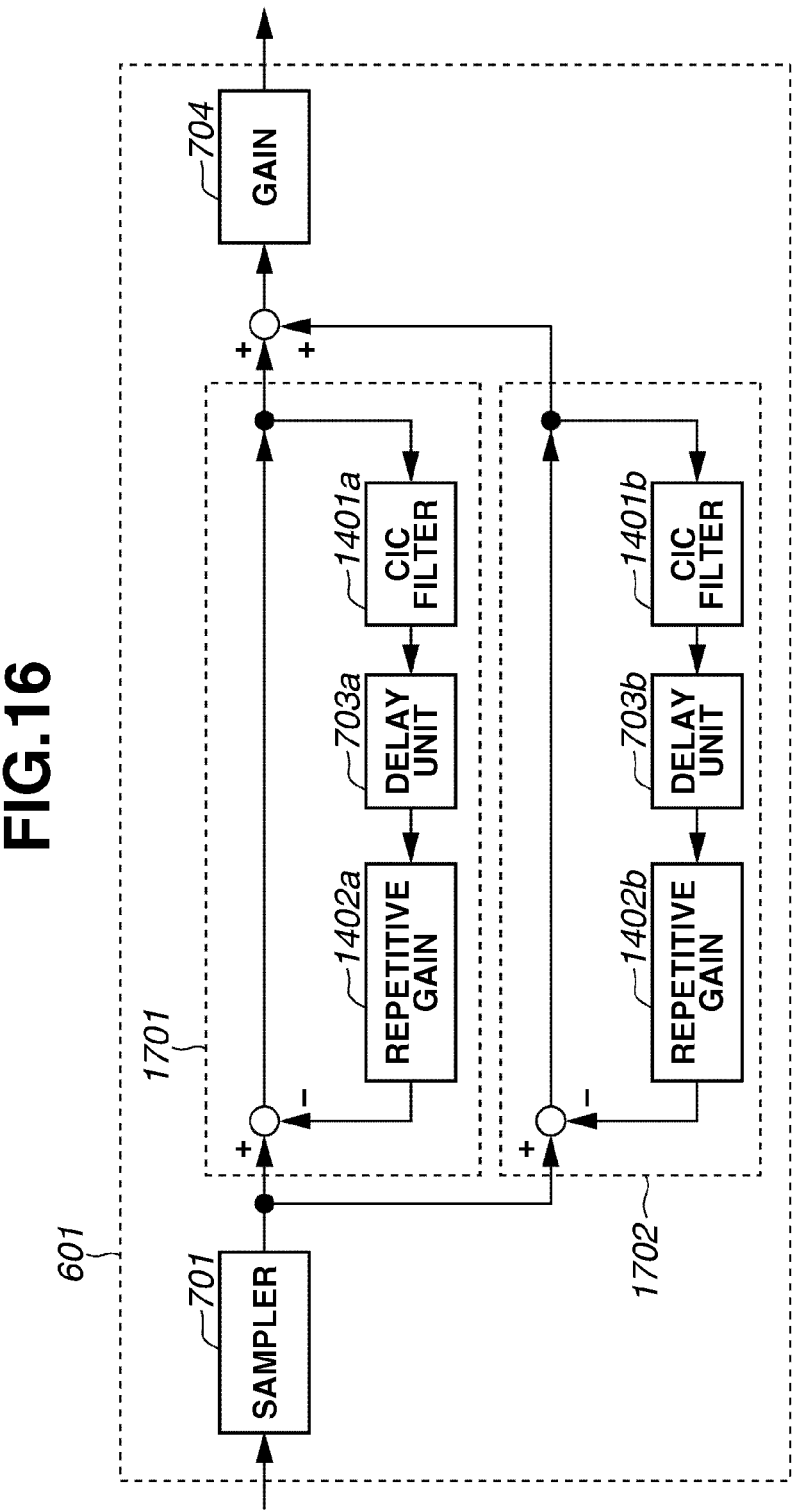
FIG. 16 illustrates a configuration, in which two repetitive compensators are provided in parallel, used in an exemplary embodiment.

FIG. 16 illustrates a configuration according to a fourth exemplary embodiment in which two repetitive compensators are provided in parallel in the repetitive compensator 601. The present exemplary embodiment is applied to the vibration-type actuator used in the first exemplary embodiment using the above-mentioned negative-feedback type repetitive compensator using the CIC filter. In the negative-feedback type repetitive compensator, a peak of a gain in an open loop characteristic occurs in only an odd order of a repetitive frequency. Therefore, a secondary harmonic component of a speed variation cannot be reduced by only one repetitive compensator. Therefore, two repetitive compensators 601 respectively having different repetitive periods are used to also reduce a component of a spatial frequency 92 which is a secondary harmonic component of a spatial frequency 46. An output signal of a sampler 701 is input to a repetitive compensator 1701 for suppressing a speed variation of the spatial frequency 46 and a repetitive compensator 1702 for suppressing a speed variation of the spatial frequency 92. A command speed is set to 232.5 rpm (a rotational period T=258 ms), and a sampling frequency of the repetitive compensator is set to 10.695 kHz. In this case, the repetitive period of the repetitive compensator 1701 is 2.8 ms (258 ms/(46×2)) from T/(an integral multiple of fs), described above. The integral multiple is set to a factor of two because the repetitive compensator is of a negative-feedback type. Therefore, a CIC filter 1401a and a delay unit 703a in the repetitive compensator 1701 may be delayed by 30 sampling periods (=2.8 ms×10.695 kHz). Therefore, a two-stage CIC filter 1401a is used and delayed by 19 sampling periods by setting the number of registers 901 in a differentiator to 20 and setting the number of registers 901 in an integrator to one, and 11 registers 901 are provided in the delay unit 703a, to configure the repetitive compensator 1701. On the other hand, the repetitive period of the repetitive compensator 1702 is 1.4 ms (258 ms/(92×2)). Therefore, a CIC filter 1401b and a delay unit 703b in the repetitive compensator 1702 may be delayed by 15 sampling periods that is half that in the repetitive compensator 1701. A two-stage CIC filter 1401b is used and delayed by nine sampling periods by setting the number of registers 901 in a differentiator to 10 and setting the number of registers 901 in an integrator to one, and six registers 901 are provided in the delay unit 703a, to configure the repetitive compensator 1702. Repetitive gain 1402a and 1402b are adjusted so that an open loop characteristic of an input/output signal in a negative-feedback loop is a gain 0 dB at a frequency of the repetitive period. A gain 704 for adding and multiplying respective outputs of the repetitive compensator 1701 and the repetitive compensator 1702 can adjust a balance with a gain of a PID compensator 102. The PID compensator 102 can totally reduce a speed variation other than a periodical speed variation caused by protrusions 301 of a vibrating member 203. In the present embodiment, the gain 704 is set so that the ratio thereof to the gain of the PID compensator 102 is 1:1.

When a control circuit provided with the repetitive compensator 601 according to the present exemplary embodiment is applied to the vibration-type actuator used in the first exemplary embodiment, not only a fundamental wave of the periodical speed variation caused by the protrusions 301 of the vibrating member 203 but also a secondary harmonic component can be reduced. Speed variations caused by the protrusions 301 of the vibrating member 203 exist at a plurality of different spatial frequencies, the speed variations having different periods can be simultaneously reduced if a plurality of repetitive compensators respectively corresponding to the spatial frequencies is connected in parallel.

The control circuit for the vibration-type actuator is also applicable to a vibration-type actuator 105 in which respective pitches of protrusions and grooves provided in an elastic member differ in an area inside the circumference of the elastic member. This is hereinafter referred to as a variable pitch type.

Figure 18:
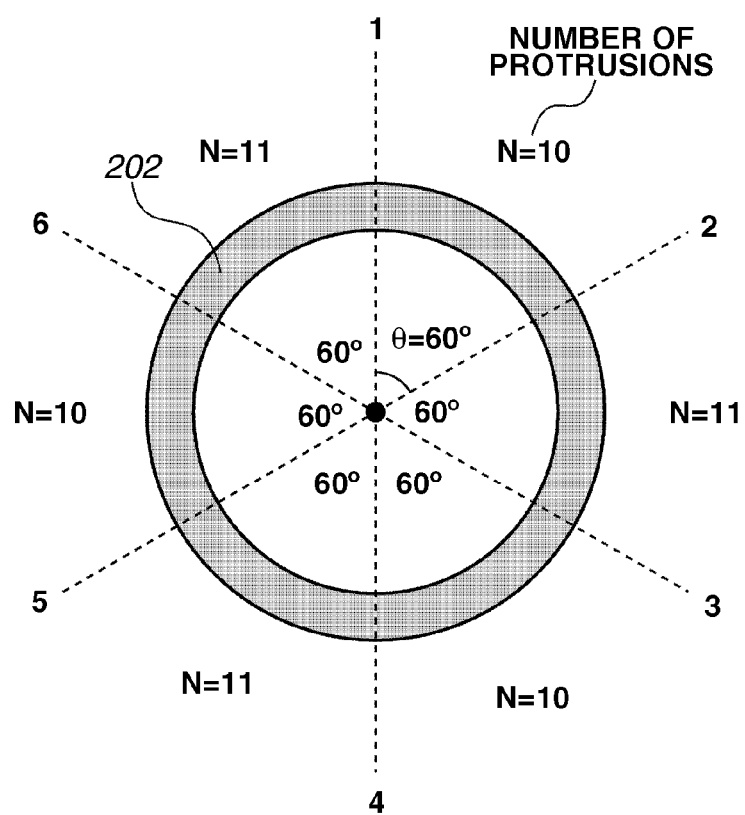
FIG. 18 is a plan view illustrating an example of a variable pitch type elastic member.

FIG. 18 is a plan view of a fifth exemplary embodiment illustrating a variable pitch type elastic member. While protrusions and grooves are formed in an elastic member 202, they are omitted in FIG. 18. An annular elastic member 202 is divided into six areas for each θ=60° with an origin as its center. In an area surrounded by a segment 1 and a segment 2, the number N of protrusions is 10. In an area surrounded by a segment 2 and a segment 3, which is adjacent to above described area, the number N of protrusions is 11. The number of projections is provided for every region with 10, 11, 10, 11 in turn. The total number of projections of the elastic member 202 is 63 per circumference. However, it is considered that a spatial frequency of a speed variation based on a contact area distribution between protrusions and a moving member has peaks appearing in the vicinity of 63 cycles/rotation.

Figure 19:
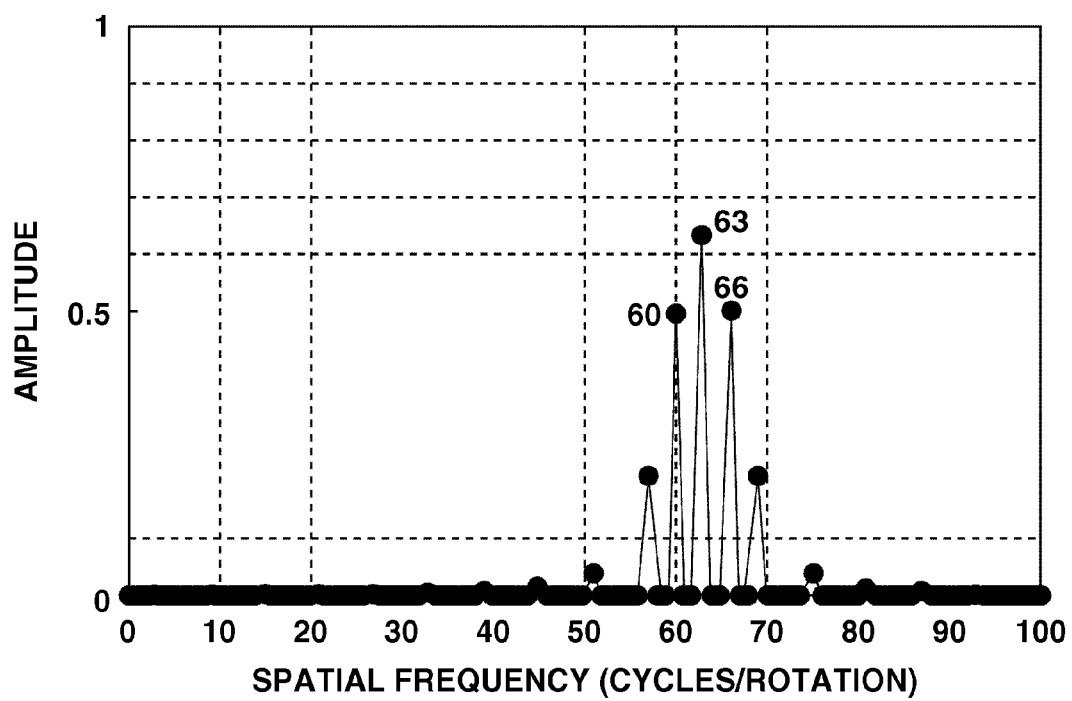
FIG. 19 illustrates a spatial frequency distribution of a speed variation of a variable pitch type vibration-type actuator.

FIG. 19 is a simulation of a spatial frequency of a speed variation in a variable pitch type vibration-type actuator. The horizontal axis indicates a spatial frequency, more specifically, a frequency per rotation (cycle/rotation), i.e., a rotation order. The vertical axis indicates amplitude of the speed variation. An input signal is calculated, assuming that a sine waveform has amplitude 1. As illustrated in FIG. 19, a spatial frequency fs, at which a peak having the largest amplitude appears, is 63 cycles/rotation. However, peaks appear at spatial frequencies fs=60 and fs=66 in the vicinity of the spatial frequency fs=63, because components of 10 protrusions×6 and 11 protrusions×6 occur in a spatial frequency manner.

When the control circuit is applied to the variation pitch type vibration-type actuator, repetitive compensators having different repetitive periods may be connected in parallel for the spatial frequencies fs of 60, 63, and 66 cycles/rotation.

Figure 20:
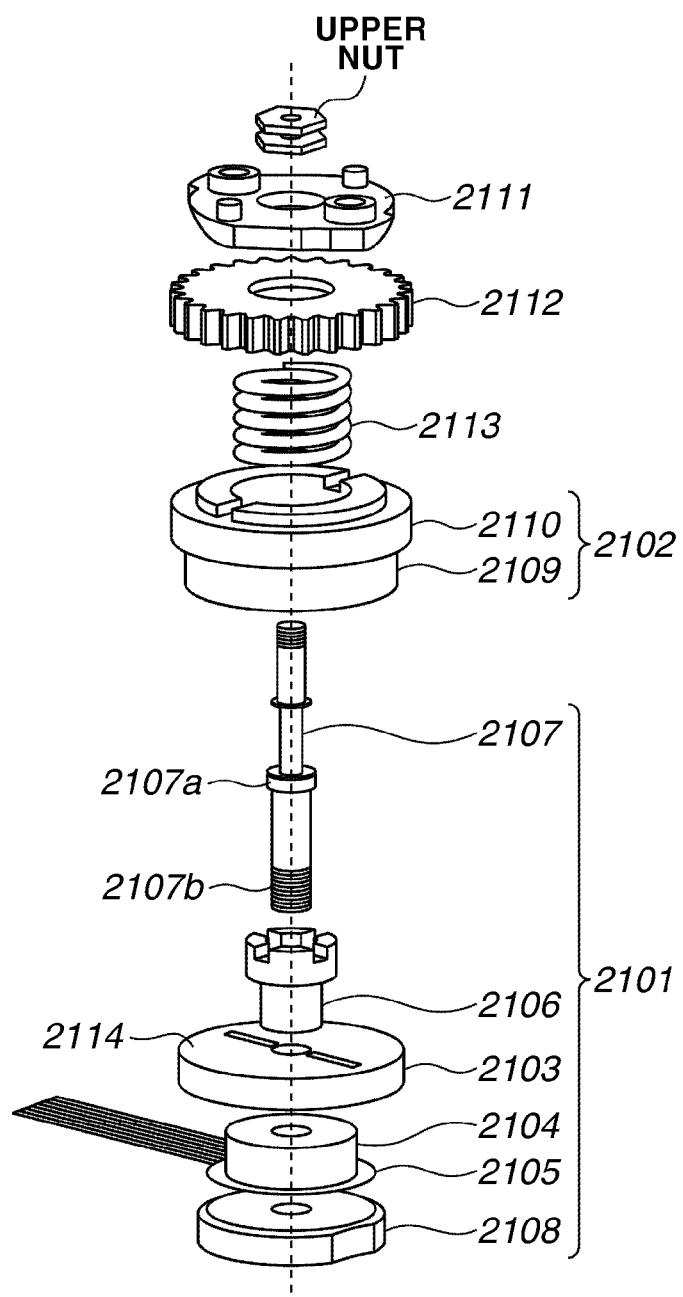
FIG. 20 is an exploded perspective view of a stick-shaped vibration-type actuator used for automatic focus driving of a camera lens.

A sixth exemplary embodiment will be described below. The control circuit for the vibration-type actuator is also applicable to another vibration-type actuator. FIG. 20 is an exploded perspective view of a stick-shaped vibration-type actuator used for automatic focus driving of a camera lens, for example. The vibration-type actuator includes a vibrating member 2101 and a moving member 2102. The vibrating member 2101 includes a first elastic member 2103 serving also as a friction material, a piezoelectric element 2104 serving as an electromechanical energy conversion element, a flexible printed circuit board 2105 for power supply to the piezoelectric element 2104, and a second elastic member 2106. The members are sandwiched between an abutting flange 2107a in a shaft 2107 and a lower nut 2108 fitted in a screw 2107b in a lower part of the shaft 2107, and are pressed and fastened to one another. The first elastic member 2103 is sintered ceramic mainly composed of alumina, for example. After both upper and lower surfaces of the first elastic member 2103 are double-edge ground, the upper friction surface is finish-polished. In the moving member 2102, a contact spring 2109 is bonded and fixed to a rotor 2110. Thus, the moving member 2102 is pressed to contact a friction surface 2114 of the vibrating member 2101 by an output gear 2112 and a pressure spring 2113 that are rotatably supported by a bearing of a flange 2111.

The contact spring 2109 in the moving member 2102 is formed in a cylindrical shape having a small crank cross section by a drawing process of stainless, and its lower end surface abuts on the friction surface 2114 of the first elastic member 2103 in the vibrating member 2101 as a friction surface of the moving member 2102. An alternating signal is applied to the piezoelectric element 2104 from a power supply (not illustrated) via the flexible printed circuit board 2105. Thus, primary bending vibrations in two directions perpendicular to each other are excited on a friction surface of the first elastic member 2103, and overlap each other with a time phase n/2, to cause rotational elliptic motion on the friction surface 2114. Thus, the contact spring 2109 that is pressed to contact the friction surface 2114 is moved relative to the vibrating member 2101.

Figure 21A:
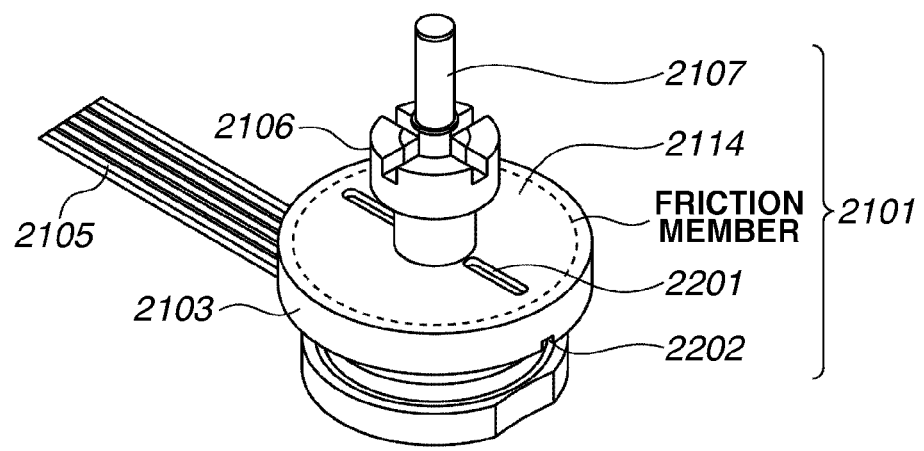
FIGS. 21A and 21B are perspective views of a vibrating member including an elastic member provided with radial grooves.
Figure 21B:
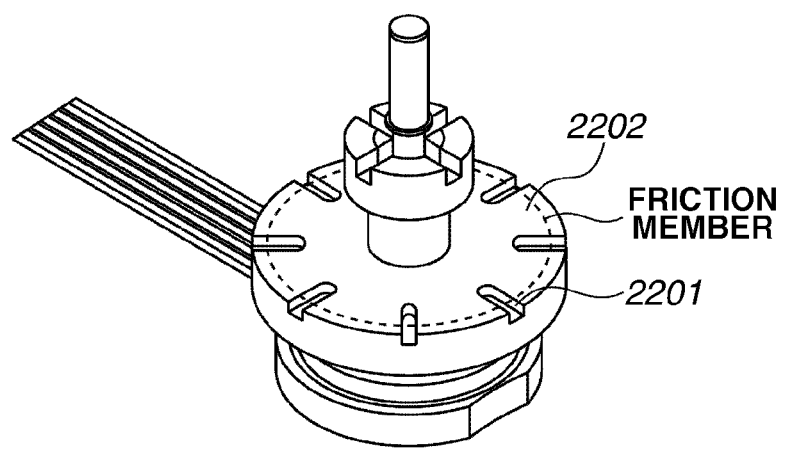

FIGS. 21A and 21B are perspective views of a vibrating member 2101 including an elastic member provided with radial grooves. The vibrating member 2101 illustrated in FIG. 21A includes a first elastic member 2103 having radial grooves (two radial grooves in this example) 2201 and 2202 respectively provided in the vicinities of its upper and lower fastening surfaces. The vibrating member 2101 illustrated in FIG. 21B includes a first elastic member 2103 having eight radial grooves 2201 provided on its upper surface. By providing the radial grooves 2201, the moving member 2101 can be prevented from not-start caused by the effect of humidity in air.

A spatial frequency of a speed variation based on a contact area distribution of a friction surface 2114 (corresponding to protrusions) and the moving member 2102, which is formed by the plurality of radial grooves 2201, has a peak appearing as fs=2 cycles/rotation in an example illustrated in FIG. 21A. In an example illustrated in FIG. 21B, a peak appears as fs=8 cycles/rotation. When the control circuit is applied to the vibration-type actuator, therefore, a plurality of repetitive compensators having repetitive periods set for a spatial frequency fs=2 or 8 cycles/rotation may be connected in parallel.

Figure 24A:
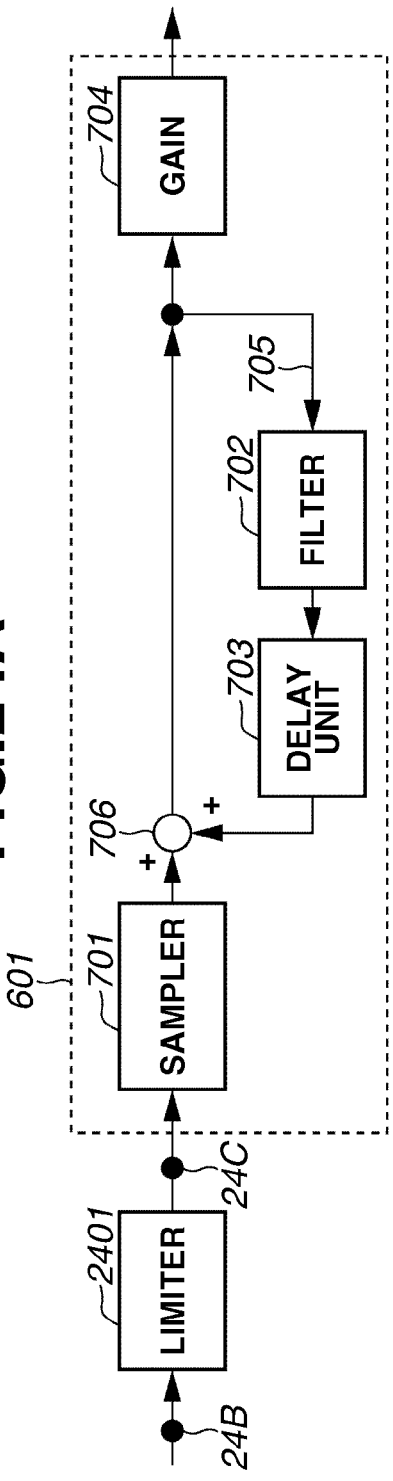
FIGS. 24A and 24C illustrate an example of a configuration in which a limiter is provided in a stage preceding a repetitive compensator.
Figure 24C:
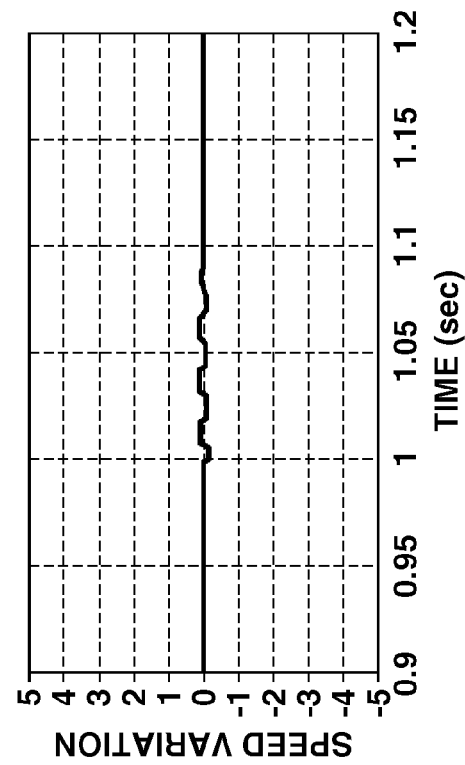
Figure 24B:
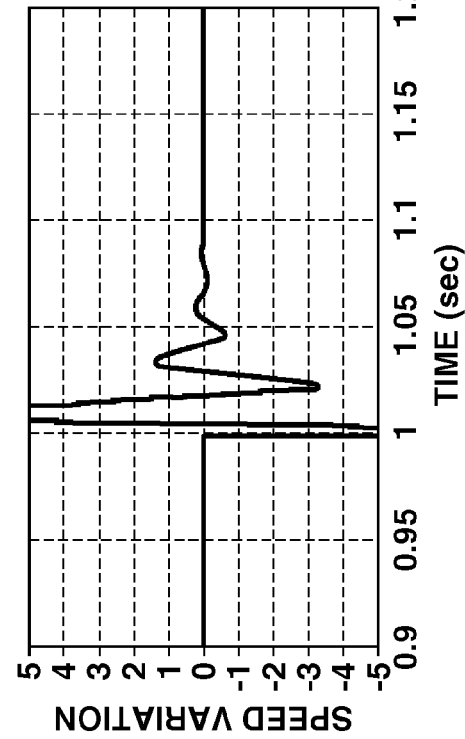

FIGS. 24A to 24C illustrate an example of a configuration according to a seventh exemplary embodiment in which a limiter is provided in a stage preceding a repetitive compensator. A limiter 2401 is provided in a stage preceding a repetitive compensator 601 so that an adverse effect on controllability by a sudden disturbance from the exterior, for example, caused by a load variation can be removed. Even a signal having a repetitive period component included in the disturbance is amplified to remain as an necessary control signal even if the disturbance signal disappears. As measures against this, if the limiter 2401 is set in a range including a maximum value and a minimum value of a periodical speed variation caused by protrusions of a vibrating member, an effect of the disturbance exceeding the limiter can be removed. FIG. 24B illustrates a signal waveform in a stage preceding the limiter 2401 in a case where a step signal is input as a disturbance. The horizontal axis indicates time, and the vertical axis indicates a speed variation. A step signal having an amplitude 1 is given as the disturbance after an elapse of 1 s. According to a transmission characteristic of a vibration-type actuator, a signal responding to the step signal occurs as a signal waveform accompanied by a great variation as illustrated in FIG. 24B. FIG. 24C illustrates a signal waveform in a stage succeeding the limiter 2401. A great variation in a range exceeding an upper limit and a lower limit of the limiter 2401 is removed by passing through the limiter 2401. The upper limit and the lower limit of the limiter 2401 are set to ±0.1. More specifically, a speed variation caused by the protrusions of the vibrating member is smaller than a load variation due to a disturbance, and a set value of the limiter 2401 can be made significantly smaller for an input range of a PID control system.

Figure 25A:
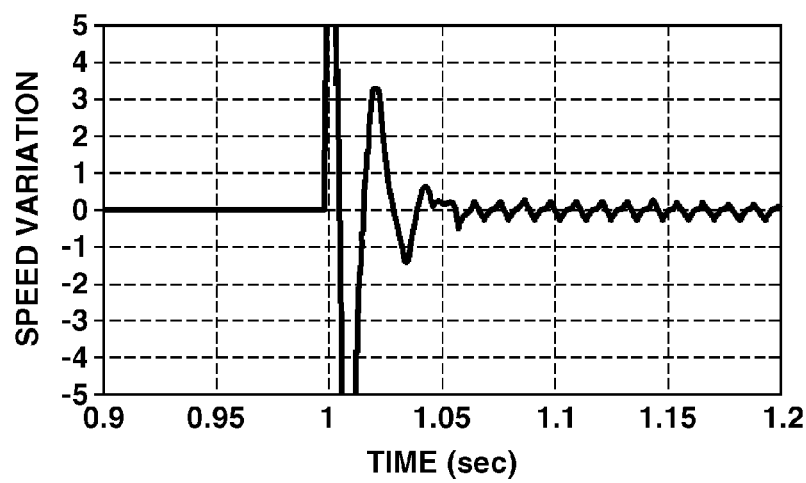
FIGS. 25A and 25B illustrate a calculation result representing an effect by a limiter of a speed variation in a case where a step signal is input as a disturbance.
Figure 25B:
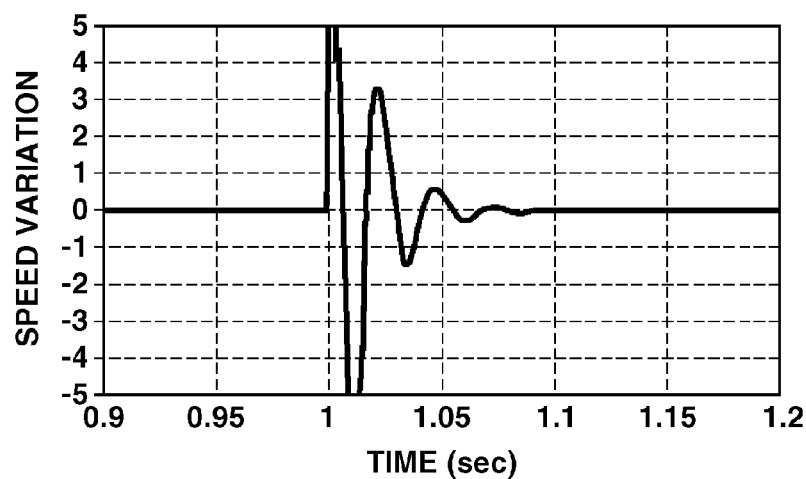

FIGS. 25A and 25B illustrate a calculation result representing an effect of a limiter for limiting a speed variation in a case where a step signal is input as a disturbance. FIG. 25A illustrates a signal waveform representing a speed variation of a vibration-type actuator in a case where a limiter is not provided. It can be seen how a speed variation having a small amplitude is continued even after an effect of the disturbance on the speed variation becomes small, i.e., after an elapse of 1.05 s. The speed variation is a frequency signal corresponding to a repetitive period and is an unnecessary control signal, thereby deteriorating controllability. On the other hand, FIG. 25B illustrates a signal waveform representing a speed variation of a vibration-type actuator in a case where a limiter is provided. The speed variation is hardly affected by the disturbance owing to the effect of the limiter. Therefore, a repetitive compensator for reducing only a speed variation caused by protrusions of a vibrating member can be implemented without deteriorating controllability by the effect of the disturbance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-090562 filed Apr. 9, 2010 and No. 2010-251156 filed Nov. 9, 2010, which are hereby incorporated by reference herein in their entirety.

What is claimed is:

1. A control circuit for a vibration-type actuator that comprises a vibrating member and a moving member, the control circuit comprising:
 a feedback control circuit configured to subject the vibration-type actuator to feedback control based on a deviation between a relative speed between the moving member and the vibrating member and a command speed or a deviation between a relative position between the moving member and the vibrating member and a command position,
 wherein the feedback control circuit comprises a repetitive compensator configured to output a signal having a repetitive period that is set to T/(an integral multiple of fs), where T is a period of rotation of the moving member, and fs is a spatial frequency of a speed deviation.

2. The control circuit according to claim 1, wherein the moving member is configured to be in contact with a plurality of protrusions of the vibrating member, and
 wherein a number of the plurality of protrusions is equal to the spatial frequency fs.

3. The control circuit according to claim 1, wherein the repetitive compensator includes a filter and a delay unit.

4. The control circuit according to claim 3, wherein the filter is a cascaded integrator comb filter including a differentiator and an integrator.

5. The control circuit according to claim 1, wherein the repetitive compensator is configured to utilize negative feedback to feed back an output of the repetitive compensator to an input of the repetitive compensator.

6. The control circuit according to claim 5, further comprising:
 a multiplier configured to multiply a gain in a path through which the output of the repetitive compensator is fed back to the input of the repetitive compensator, and the gain of the multiplier is set so that an open loop characteristic of the repetitive compensator is less than 0 dB at a frequency of the repetitive period.

7. The control circuit according to claim 1, wherein the repetitive compensator includes repetitive compensators that differ in repetitive periods.

8. The control circuit according to claim 7, wherein the repetitive compensators are connected in parallel.

9. The control circuit according to claim 1, further comprising:
a limiter provided in a stage preceding the repetitive compensator.

10. The control circuit according to claim 1, wherein the vibration-type actuator is configured to generate a vibration wave in the vibrating member including an electromechanical energy conversion element by applying an alternating voltage to the electromechanical energy conversion element, and relatively rotates the moving member contacting a plurality of protrusions of the vibrating member.

11. The control circuit according to claim 1, wherein the speed deviation is based on a contact area distribution between the vibrating member and the moving member.

12. A control circuit for a vibration-type actuator that comprises a vibrating member and a moving member, the control circuit comprising:
a deviation obtainer configured to obtain speed deviation between a relative speed between the moving member and the vibrating member and a command speed or positional deviation between a relative position between the moving member and the vibrating member and a command position;
a first compensator connected to a speed deviation detector;
a second compensator connected to the speed deviation detector; and
a circuit configured to output a signal based on an output from the first compensator and an output from the second compensator,
wherein the second compensator comprises a repetitive compensator configured to output a signal having a repetitive period that is set to T/(an integral multiple of fs), where T is a period of rotation of the moving member, and fs is a spatial frequency of a speed deviation.

13. The control circuit according to claim 12, wherein the moving member is configured to be in contact with a plurality of protrusions of the vibrating member, and
wherein a number of the plurality of protrusions is equal to the spatial frequency fs.

14. The control circuit according to claim 12, wherein the second compensator includes a filter and a delay unit.

15. The control circuit according to claim 14, wherein the filter is a cascaded integrator comb filter including a differentiator and an integrator.

16. The control circuit according to claim 14, wherein the second compensator is configured to utilize negative feedback to feed back an output of the second compensator to an input of the second compensator.

17. The control circuit according to claim 16, further comprising:
a multiplier configured to multiply a gain in a path through which the output of the second compensator is fed back to the input of the second compensator, and the gain of the multiplier is set so that an open loop characteristic of the second compensator is less than 0 dB at a frequency of the repetitive period.

18. The control circuit according to claim 12, wherein the second compensator includes repetitive compensators that differ in repetitive periods.

19. The control circuit according to claim 18, wherein the repetitive compensators are connected in parallel.

20. The control circuit according to claim 12, further comprising a limiter provided in a stage preceding the second compensator.

21. The control circuit according to claim 12, wherein the vibration-type actuator is configured to generate a vibration wave in the vibrating member including an electromechanical energy conversion element by applying an alternating voltage to the electromechanical energy conversion element, and relatively rotates the moving member contacting a plurality of protrusions of the vibrating member.

22. The control circuit according to claim 12, wherein the speed deviation is based on a contact area distribution between the vibrating member and the moving member.

* * * * *